(12) United States Patent
Watanabe et al.

(10) Patent No.: US 12,466,000 B2
(45) Date of Patent: Nov. 11, 2025

(54) WAVEFORM CONTROL DEVICE FOR LASER LITHOTRIPSY APPARATUS, LASER LITHOTRIPSY METHOD, AND CRUSHING METHOD

(71) Applicant: OLYMPUS CORPORATION, Tokyo (JP)

(72) Inventors: Takeshi Watanabe, Tokyo (JP); Takumi Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 759 days.

(21) Appl. No.: 17/735,211

(22) Filed: May 3, 2022

(65) Prior Publication Data

US 2022/0302667 A1    Sep. 22, 2022

Related U.S. Application Data

(63) Continuation of application No. PCT/JP2020/020412, filed on May 22, 2020.
(Continued)

(51) Int. Cl.
*B23K 26/0622* (2014.01)
*A61B 18/26* (2006.01)
(Continued)

(52) U.S. Cl.
CPC .......... *B23K 26/0622* (2015.10); *A61B 18/26* (2013.01); *A61P 13/12* (2018.01);
(Continued)

(58) Field of Classification Search
None
See application file for complete search history.

(56) References Cited

U.S. PATENT DOCUMENTS

| 6,022,309 A | 2/2000 | Celliers et al. |
| 2002/0045890 A1 | 4/2002 | Celliers et al. |

(Continued)

FOREIGN PATENT DOCUMENTS

| CA | 3 024 957 A1 | 12/2017 |
| EP | 2 840 999 B1 | 3/2016 |

(Continued)

OTHER PUBLICATIONS

Blackmon, R.L., et al., "Enhanced thulium fiber laser lithotripsy using micro-pulse train modulation", Journal of Biomedical Optics, vol. 17(2), 028002, SPIE, doi: 10.1117/1.JBO.17.2.028002.
(Continued)

*Primary Examiner* — Mallika D Fairchild
(74) *Attorney, Agent, or Firm* — Scully, Scott, Murphy & Presser, P.C.

(57) ABSTRACT

Provided is a waveform control device for a laser lithotripsy apparatus including: a processor including hardware, the processor being configured to: pulse a laser beam; change an output of the pulsed laser beam; continuously emit the laser beam until a bubble generated from a laser emission end by an irradiation of the laser beam reaches a crushing target; and after the bubble generated from the laser emission end reaches the crushing target, reduce the output of the laser beam or turn off the irradiation of the laser beam during a period in which there is the bubble between the laser emission end and the crushing target, and the bubble does not couple the laser emission end and the crushing target.

20 Claims, 31 Drawing Sheets

Related U.S. Application Data

(60) Provisional application No. 62/934,019, filed on Nov. 12, 2019.

(51) Int. Cl.
*A61P 13/12* (2006.01)
*B23K 26/08* (2014.01)
*B23K 26/40* (2014.01)
*H01S 3/067* (2006.01)
*H01S 3/16* (2006.01)

(52) U.S. Cl.
CPC .......... *B23K 26/0853* (2013.01); *B23K 26/40* (2013.01); *H01S 3/06716* (2013.01); *H01S 3/1616* (2013.01); *A61B 2018/263* (2013.01)

(56) References Cited

U.S. PATENT DOCUMENTS

| | | |
|---|---|---|
| 2015/0100048 A1 | 4/2015 | Hiereth et al. |
| 2015/0289937 A1* | 10/2015 | Chia .................. A61B 1/00009 606/2.5 |
| 2015/0313444 A1 | 11/2015 | Wolf |
| 2015/0342678 A1* | 12/2015 | Deladurantaye ........ A61F 9/008 606/5 |
| 2016/0051125 A1 | 2/2016 | Wolf |
| 2017/0354464 A1 | 12/2017 | Waisman et al. |
| 2018/0206918 A1 | 7/2018 | Waisman et al. |
| 2019/0183573 A1 | 6/2019 | Waisman et al. |
| 2019/0298449 A1* | 10/2019 | Khachaturov ......... A61B 18/26 |
| 2021/0113268 A1 | 4/2021 | Waisman et al. |
| 2021/0161364 A1 | 6/2021 | Fukushima et al. |
| 2021/0378745 A1 | 12/2021 | Fukushima et al. |

FOREIGN PATENT DOCUMENTS

| | | |
|---|---|---|
| EP | 3 412 239 A1 | 12/2018 |
| JP | 2000-508938 A | 7/2000 |
| JP | 2017-515561 A | 6/2017 |
| WO | 1997/039690 A1 | 10/1997 |
| WO | 2013/159793 A1 | 10/2013 |
| WO | 2015/171289 A1 | 11/2015 |
| WO | 2017/212404 A1 | 12/2017 |
| WO | 2019/186564 A1 | 10/2019 |
| WO | 2020/021590 A1 | 1/2020 |
| WO | 2020/033121 A1 | 2/2020 |
| WO | 2020/174686 A1 | 9/2020 |

OTHER PUBLICATIONS

Gonzalez, D.A., et al., "Comparison of single, dual, and staircase temporal pulse profiles for reducing stone retropulsion during thulium fiber laser lithotripsy in an in vitro stone phantom model",Proceedings of SPIE10852, Therapeutics and Diagnostics in Urology 2019, 108520E(Feb. 26, 2019), doi: 10.1117/12.2514052.

International Search Report dated Aug. 11, 2020 received in PCT/JP2020/020412.

* cited by examiner

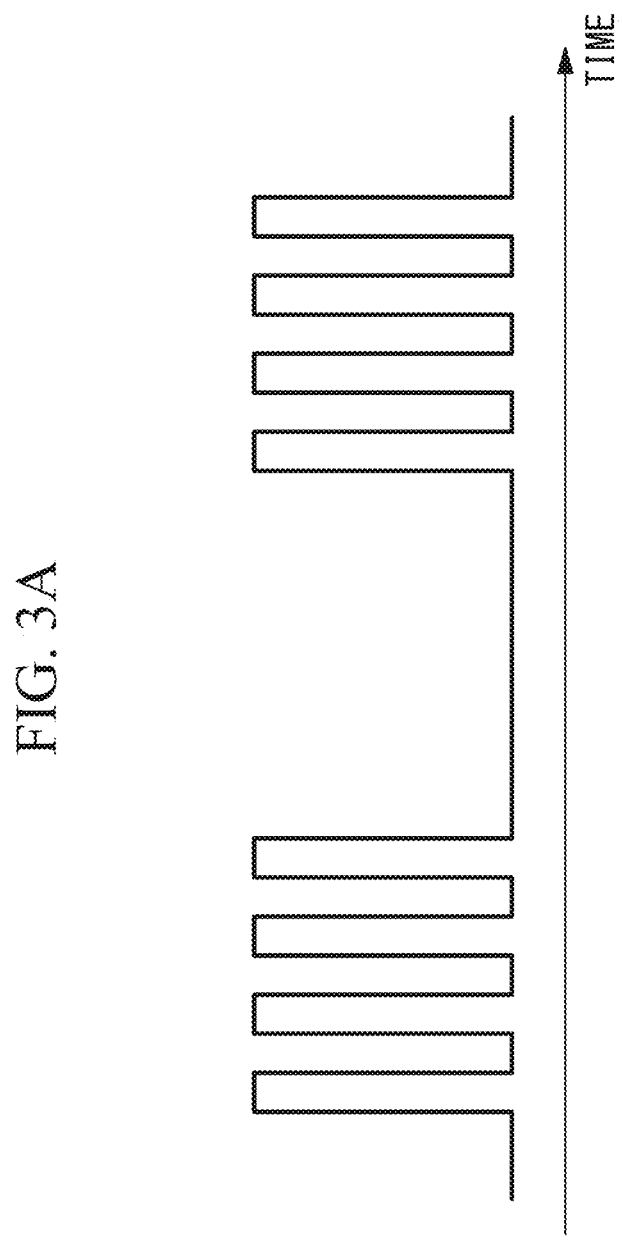

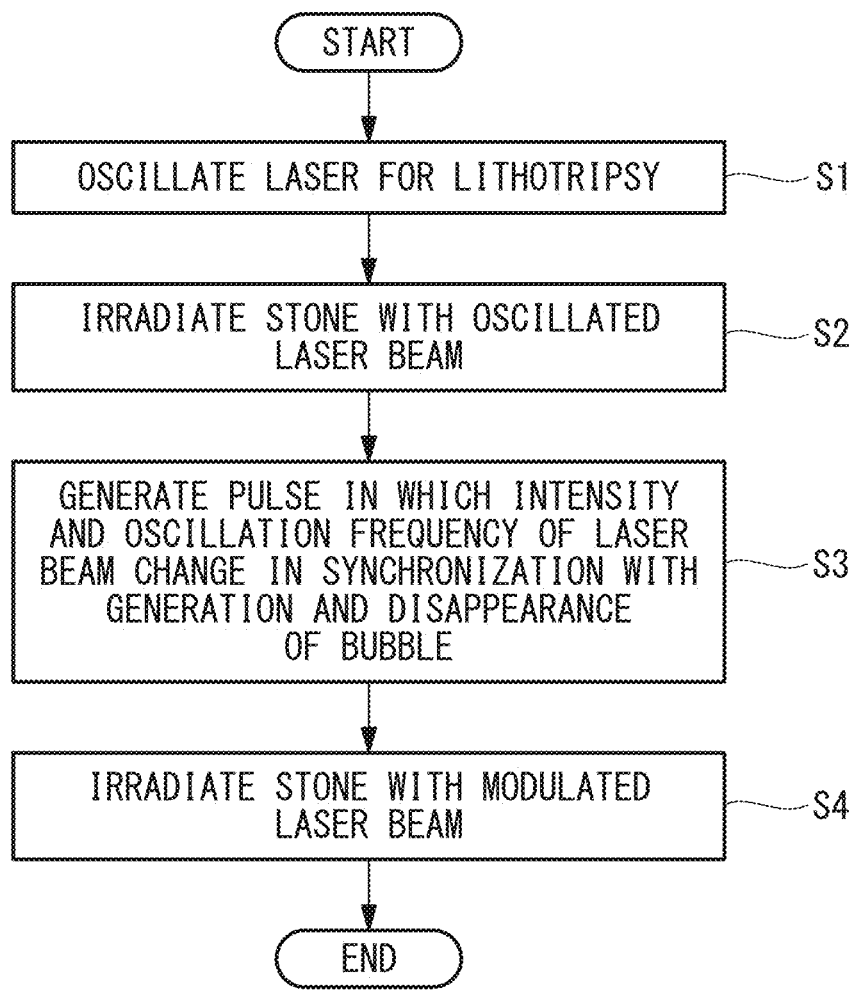

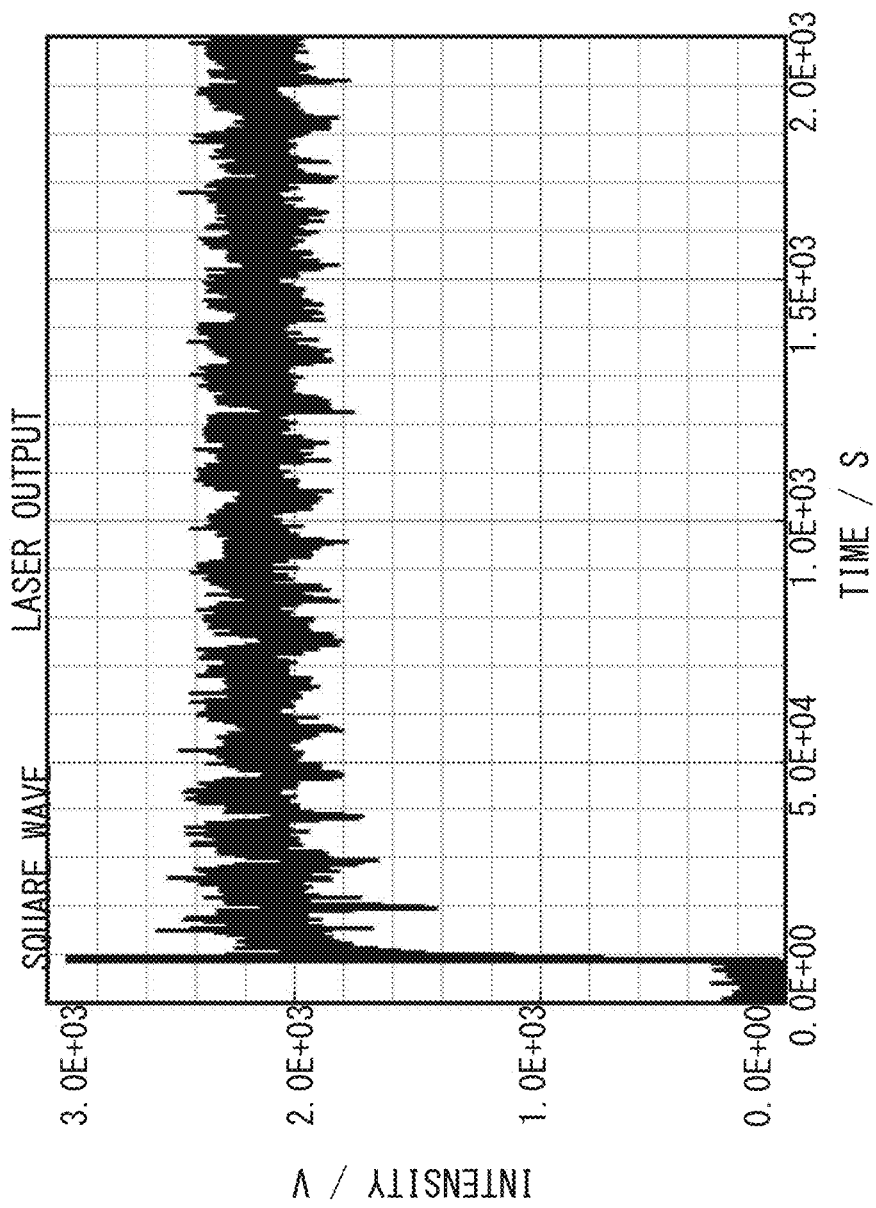

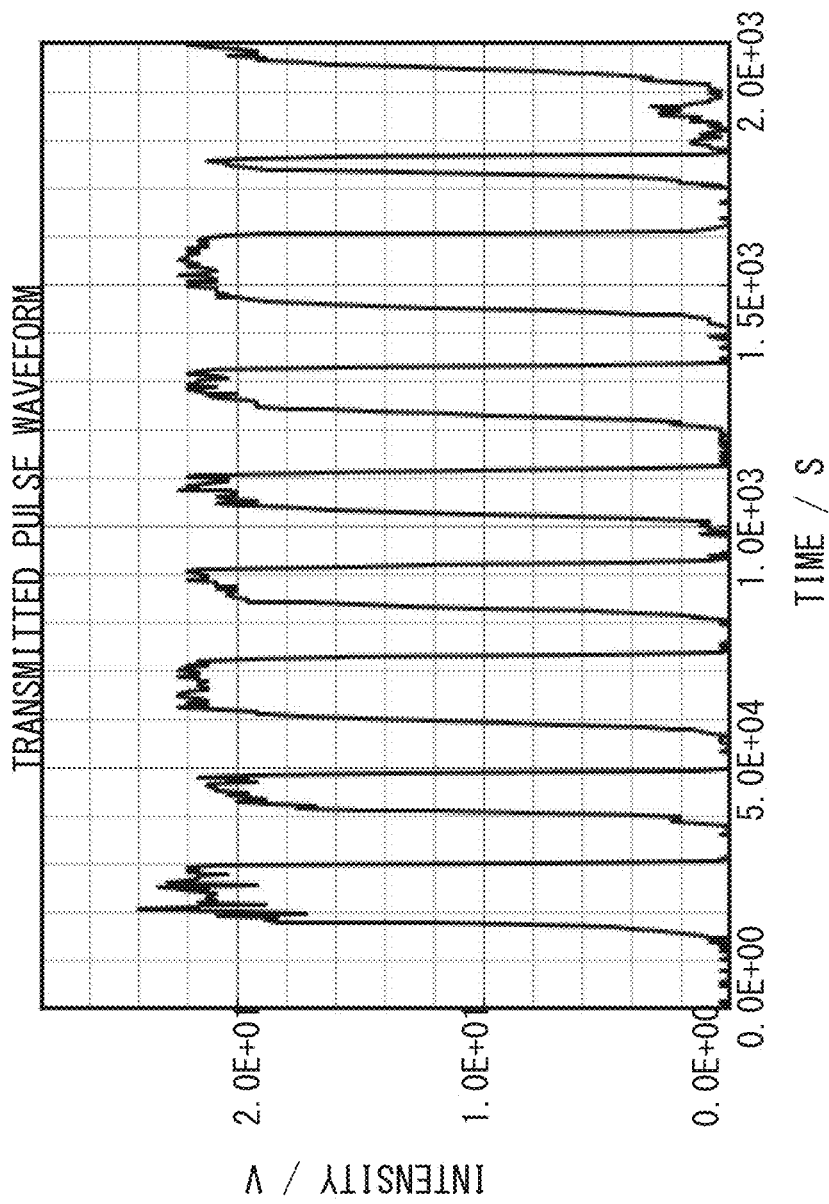

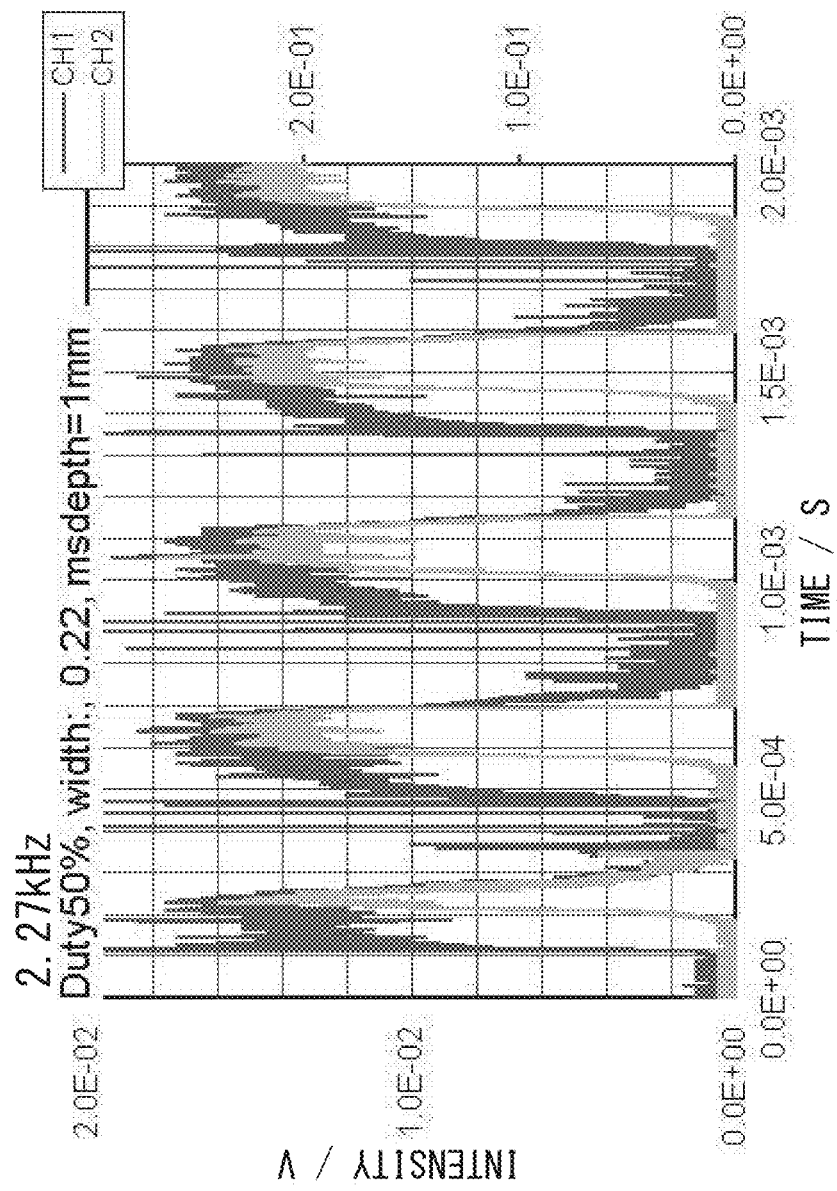

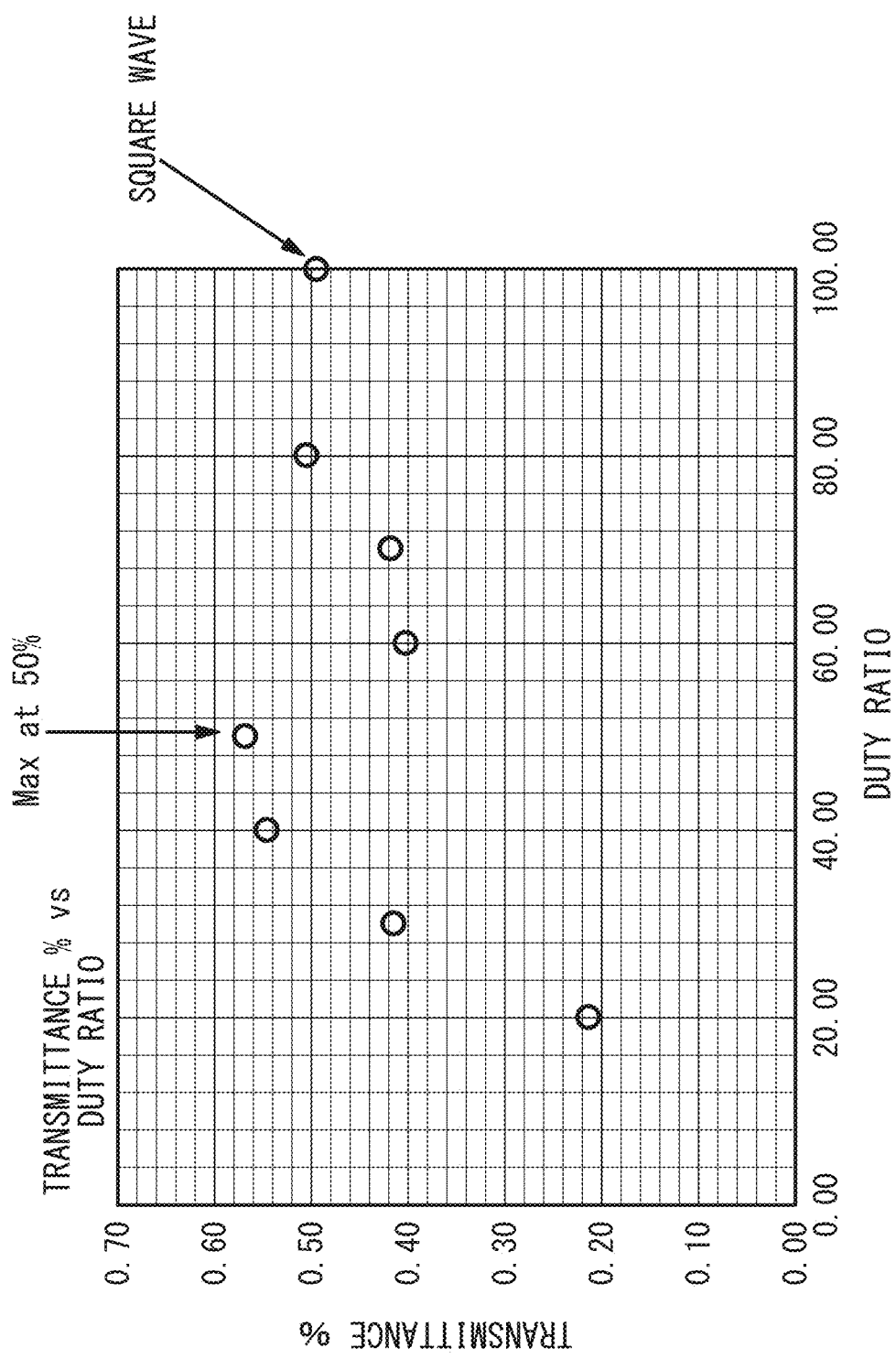

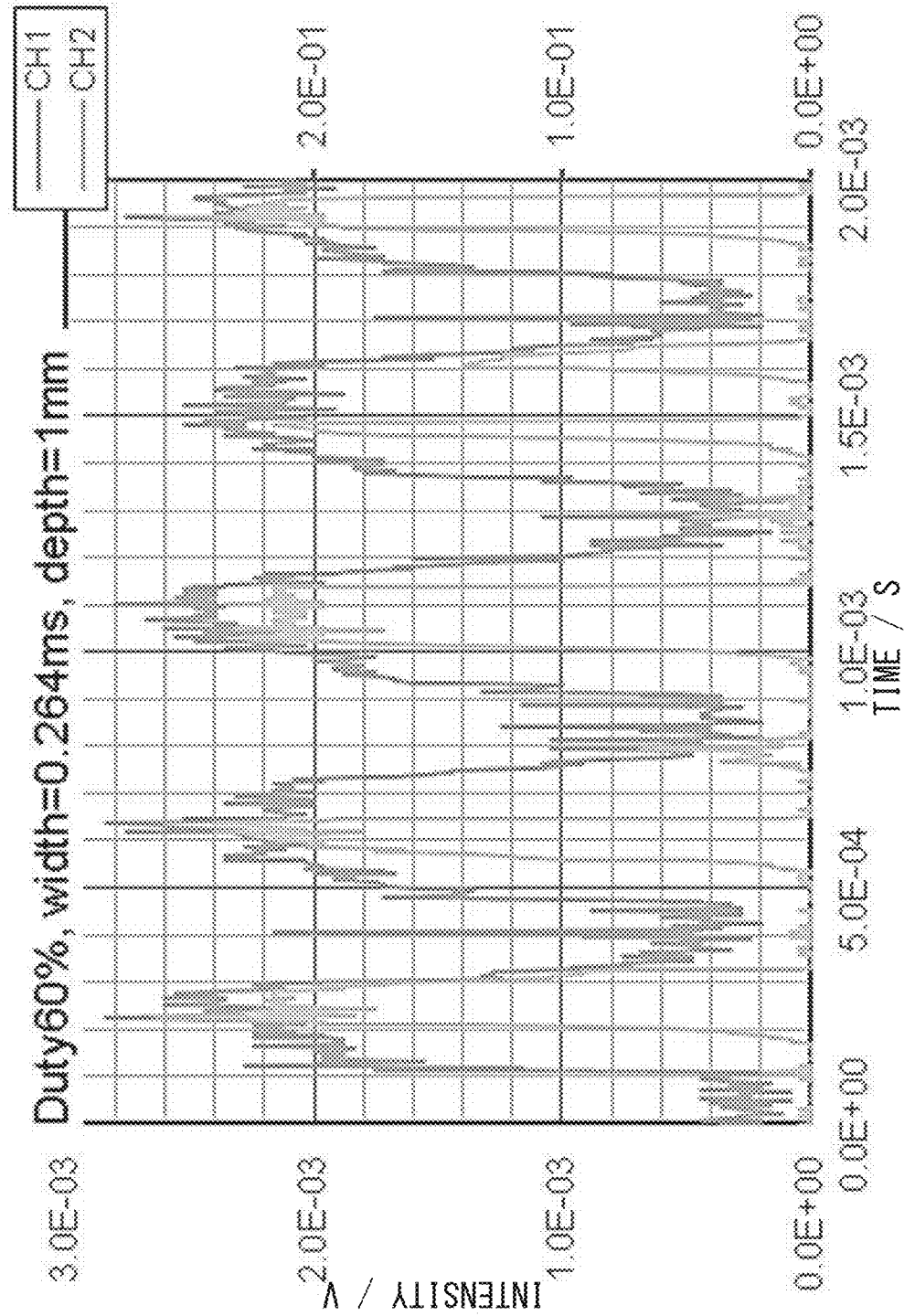

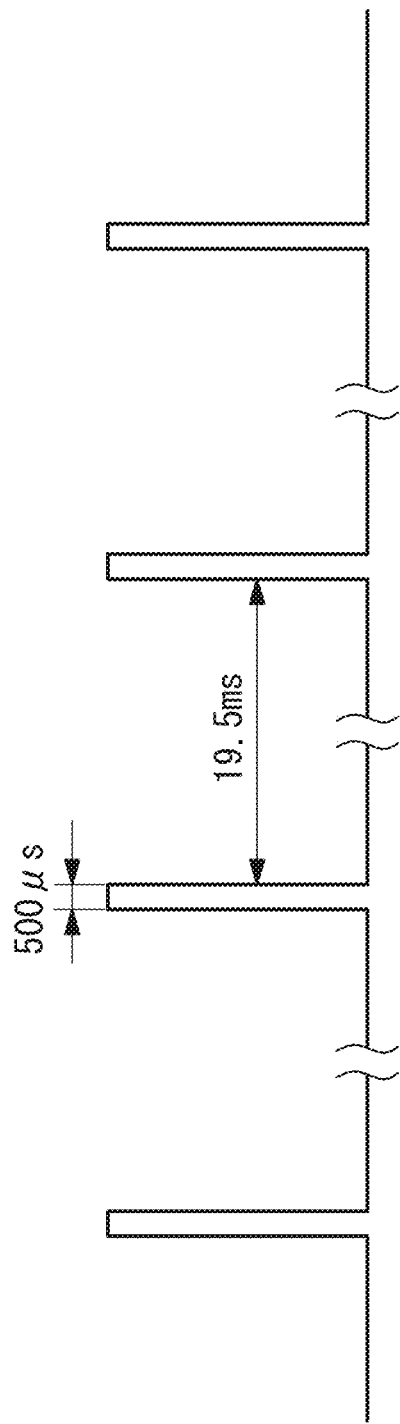

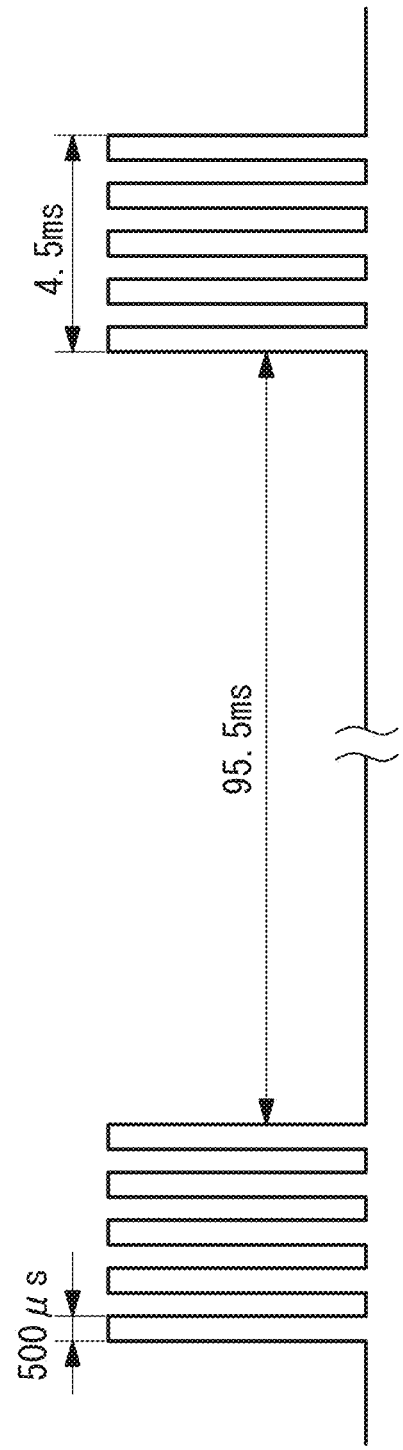

WAVEFORM CONTROL DEVICE FOR LASER LITHOTRIPSY APPARATUS, LASER LITHOTRIPSY METHOD, AND CRUSHING METHOD

CROSS-REFERENCE TO RELATED APPLICATION

The application claims the benefit of priority from U.S. Provisional Patent Application No. 62/934,019, filed on Nov. 12, 2019, the entire contents of which are incorporated herein by reference.

This is a continuation of International Application PCT/JP2020/020412 filed on May 22, 2020, which is hereby incorporated by reference herein in its entirety.

TECHNICAL FIELD

The present invention relates to a waveform control device for a laser lithotripsy apparatus, a laser lithotripsy method, and a crushing method.

BACKGROUND ART

Laser lithotripsy is a treatment method in which stones in the urinary tract, that is, the kidney, the ureter, or the bladder is irradiated with a laser beam to remove the stones in a finely divided state. In the laser lithotripsy, the stones are crushed to a size that is equal to or smaller than a size that can be recovered in a basket or equal to or smaller than a size that can be naturally discharged by a steam explosion due to a temperature rise caused when an energy of the laser beam is absorbed in water in the stones, or a thermochemical change and so on due to absorption of the energy of the laser beam caused by the stone itself. For the laser lithotripsy, a laser beam having a wavelength that induces a temperature rise of water or the stone itself due to the laser beam is generally used. When the laser lithotripsy is used in a living body, it is necessary to efficiently propagate the laser beam to the stone surrounded by a liquid.

In recent years, various studies have been reported for improving action of lithotripsy with the laser beam. A laser wavelength capable of causing a temperature rise of the stone is, in principle, a wavelength itself that is absorbed by water or a solvent around the stone. For this reason, the laser beam is difficult to be propagated to the stone without being absorbed by water or a solvent around the stone, and a method has not been realized in which the laser beam sufficiently reaches the urinary stone without loss.

PTL 1 discloses a method for improving a transmittance of a laser beam in water. In PTL 1, as shown in FIG. 19, a technique is disclosed in which a first laser pulse is generated at T1 to generate a small-sized bubble, and then a second laser pulse is generated at T2 with an interval while the bubble does not disappear to improve the transmittance. In PTL 1, a Ho: YAG laser is used.

NPL 1 is a literature investigated with crushing efficiency of a stone when a laser pulse is irradiated in a state where a fiber is in contact with the stone. In NPL 1, water, a saline solution, an aqueous solution, and an organic solution between a fiber tip and the stone are not considered. NPL 1 states that lithotripsy efficiency is higher when a pulse train shown in FIG. 20B is used compared with when a pulse train shown in FIG. 20A is used, in a case of irradiating a pulse under the same irradiation energy condition in a condition where a fiber is brought into contact with the stone. It is explained that this is because an energy is stored in the stone itself and the energy is dissipated from the stone itself. In NPL 1, a Tm fiber laser is used. Further, in NPL 1, a laser pulse having a peak value of 70 W, a pulse width of the pulse train of 500 μs, and an energy of 35 mJ is emitted from a tip of an optical fiber having a fiber core diameter of 100 μm.

PTL 2 is an international application published after U.S. Provisional Application No. 62/934,019, filed on Nov. 12, 2019, which the application claims the benefit of priority. Background in PTL 2 cites a conventional laser lithotripsy technique using first and second laser pulses having different pulse widths as in PTL 1, as an example of causing insufficient laser crushing. In PTL 2, as shown in FIG. 21, a laser pulse including a first pulse with low output and a second pulse with high output is used, and an interval between the first and second pulses is chosen such that a bubble generated by the first pulse reaches the stone and disappears before the second pulse is irradiated.

CITATION LIST

Patent Literature

{PTL 1} US Unexamined Patent Application, Publication No. 2017/0354464
{PTL 2} PCT International Publication No. 2020/033121

Non Patent Literature

{NPL 1} N. M. Fried et al., J. Biomed. Opt. 17(2012) 028002

SUMMARY OF INVENTION

One aspect of the present invention provides a waveform control device for a laser lithotripsy apparatus including: a processor including hardware, the processor being configured to: pulse a laser beam; change an output of the pulsed laser beam; continuously emit the laser beam until a bubble generated from a laser emission end by an irradiation of the laser beam reaches a crushing target; and after the bubble generated from the laser emission end reaches the crushing target, reduce the output of the laser beam or turn off the irradiation of the laser beam during a period in which there is the bubble between the laser emission end and the crushing target, and the bubble does not couple the laser emission end and the crushing target.

Another aspect of the present invention provides a laser lithotripsy method executed by a processor, the method including: continuously emitting the laser beam until a bubble generated from a laser emission end reaches a crushing target; and after the bubble generated from the laser emission end reaches the crushing target, reducing an output of the laser beam or turning off an irradiation of the laser beam during a period in which there is the bubble between the laser emission end and the crushing target, and the bubble does not couple the laser emission end and the crushing target.

Further another aspect of the present invention provides a crushing method including: inserting an endoscope into a specimen; disposing a laser emission unit toward a crushing target existing in a liquid; irradiating the crushing target with a pulsed laser beam from the laser emission unit; displaying an image data acquired by the endoscope in a display; and setting a waveform of the laser beam on the basis of the image data, wherein the waveform is formed so as to: continuously emit the laser beam until a bubble generated from the laser emission unit reaches the crushing target; and after the bubble generated from the laser emission unit reaches the crushing target, reduce an output of the laser beam or turn off an irradiation of the laser beam during a period in which there is the bubble between the laser emission unit and the crushing target, and the bubble does not couple the laser emission unit and the crushing target.

BRIEF DESCRIPTION OF DRAWINGS

FIG. 3A is a view showing an example of a square pulse train.

FIG. 4 is a flowchart illustrating a laser lithotripsy method according to the embodiment of the present invention.

FIG. 10A is a view illustrating an output waveform of a laser beam.

FIG. 10B is a view illustrating a waveform after water transmission of a laser beam.

FIG. 15C is a view illustrating a relation between an output waveform and a water transmission waveform of a laser beam with a pulse train frequency of 2.27 kHz.

FIG. 17 is a view illustrating a relation between a duty ratio and a transmittance.

FIG. 18B is a view showing an example of a transmittance when a duty ratio is 60%.

FIG. 20A is a view illustrating NPL 1.

FIG. 20B is another view illustrating NPL 1.

DESCRIPTION OF EMBODIMENTS

A laser lithotripsy apparatus, a laser lithotripsy system, and a laser lithotripsy method according to an embodiment of the present invention will be described below with reference to the drawings.

Figure 1:
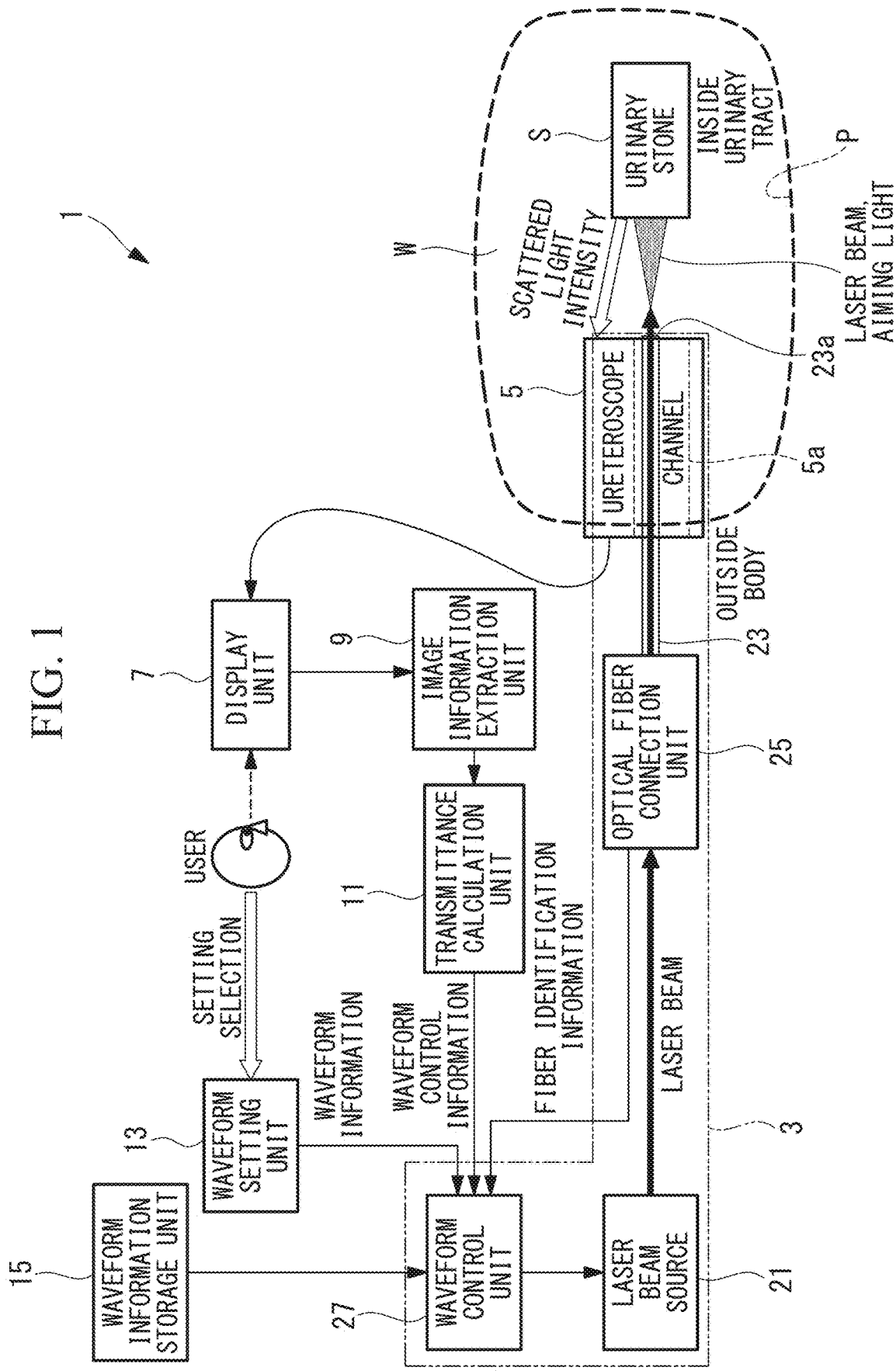
FIG. 1 is a schematic block diagram of a laser lithotripsy system according to an embodiment of the present invention.

As shown in FIG. 1, a laser lithotripsy system 1 according to the present embodiment includes a laser lithotripsy apparatus 3, a rigid or flexible ureteroscope (imaging unit) 5, a display unit 7, an image information extraction unit 9, a transmittance calculation unit 11, a waveform setting unit 13, and a waveform information storage unit 15.

The laser lithotripsy apparatus 3 includes a laser beam source 21, an optical fiber (a laser emission unit) 23, an optical fiber connection unit 25, and a waveform control unit (a pulse generation unit, a repetition frequency adjustment unit, a laser output change unit) 27.

As the laser beam source 21, for example, a Thulium Fiber Laser (TLR-50/500-QCW-AC-Y16, IPG Photonics) can be used. Alternatively, examples of the laser beam source 21 may include a Thulium Fiber Laser, that is, TLR-50/500-QCW, TLR-10, TLR-30, TLR-50, TLR-120, TLR-200, TLR-500, TLM-100, TLM-120, or TLM-200. Further, as the laser beam source 21, a Tm: YAG Laser, an Er: YAG Laser, an Nd: YAG Laser, a YFL, a Cr: ZnSe/S, or a cw Er fiber laser may be used.

The optical fiber 23 may be, for example, either a single mode fiber or a multimode fiber, or may be a fiber having a double clad structure. The optical fiber 23 is guided into a urinary tract P through a channel 5a of the ureteroscope 5. The urinary tract P is filled with urine and a solution W such as water or saline solution. The optical fiber 23 includes a fiber tip (laser emission end) 23a that emits a guided laser beam. Further, the optical fiber 23 can emit aiming light from a distal end 23a of the fiber.

The optical fiber connection unit 25 reads information of the connected optical fiber 23. Then, the optical fiber connection unit 25 transmits fiber identification information including characteristics such as a core diameter and NA of the optical fiber 23 to the waveform control unit 27.

The ureteroscope 5 observes a form of a urinary stone (a crushing target) S. The ureteroscope 5 is equipped with a function of generating a ureteroscope image in which the urinary stone S is imaged. The image generated by the ureteroscope 5 is displayed on the display unit 7. Based on the ureteroscope image on the screen displayed on the display unit 7, a user can confirm whether a bubble B (see FIG. 2) generated by a laser beam has reached the urinary stone S. Then, the user makes a determination by looking at the ureteroscope image, and thus can set a waveform of the laser beam using the waveform setting unit 13.

The image information extraction unit 9 extracts scattered light intensity of the aiming light emitted from the distal end 23a of the fiber based on the ureteroscope image generated by the ureteroscope 5.

The transmittance calculation unit 11 calculates transmittance of the aiming light from the scattered light intensity extracted by the image information extraction unit 9. Further, the transmittance calculation unit 11 generates waveform control information based on the calculated transmittance, and transmits the generated waveform control information to the waveform control unit 27.

The waveform setting unit 13 sets the waveform of the laser beam selected by the user. The waveform setting unit 13 transmits waveform information indicating the set waveform to the waveform control unit 27.

The waveform information storage unit 15 stores wavelength information of the laser beam source 21 and waveform information used to generate an appropriate waveform based on the wavelength information.

The waveform control unit 27 acquires desired waveform information from the waveform information storage unit 15, based on at least one of the fiber identification information sent from the optical fiber connection unit 25, the waveform information sent from the waveform setting unit 13, and the waveform control information sent from the transmittance calculation unit 11. Then, the waveform control unit 27 controls oscillation of the laser beam source 21 based on the acquired waveform information. Processing by the image information extraction unit 9, the transmittance calculation unit 11, and the waveform control unit 27 may be executed by at least one processor including hardware.

The waveform control unit 27 generates a bubble B when the laser beam is propagated in a liquid and forms the laser beam oscillated from the laser beam source 21 into a pulse with a frequency at which the intensity and the oscillation frequency of the laser beam change in synchronization with the generation and extinction (disappearance) of the generated bubble.

Figure 2:
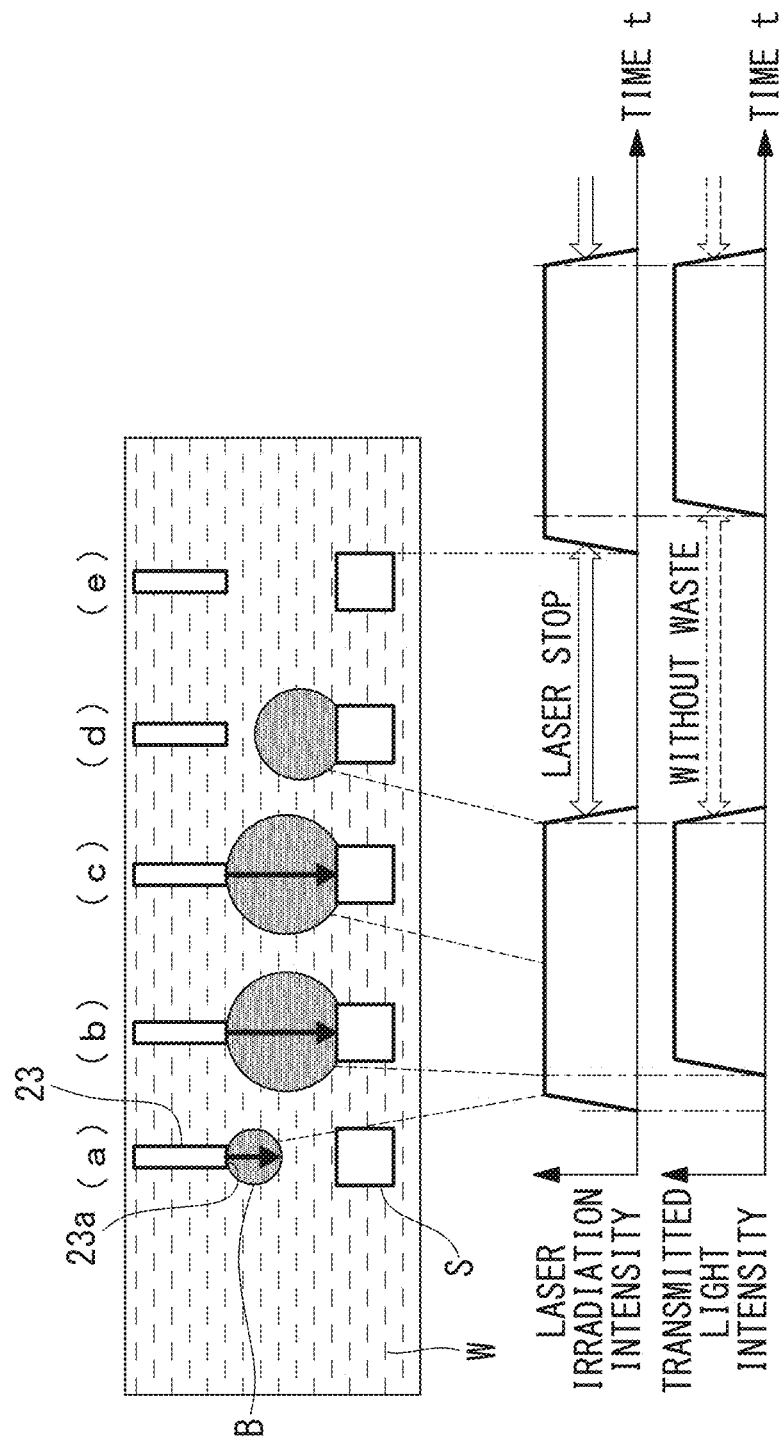
FIG. 2 is a view illustrating a relation between a laser irradiation intensity and a transmitted light intensity by the laser lithotripsy apparatus shown in FIG. 1.

Specifically, as shown in FIG. 2, the waveform control unit 27 adjusts the repetition frequency to a pulse train of a frequency at which the bubble B is generated in the solution W by the laser beam, and a pulse train of a frequency at which the laser beam is irradiated during the period overlapping with the generation period in which the bubble B is generated in the solution W by the laser beam until immediately before the bubble disappears and at which the output of the laser beam is reduced during the period overlapping with the disappearance period starting when the bubble B disappears immediately after the generation period until it is able to be generated again. In the present embodiment, the output of the laser beam is set to zero during the period overlapping with the disappearance period. Since the laser beam is stopped, the generation of the bubble B is suppressed.

Figure 3B:
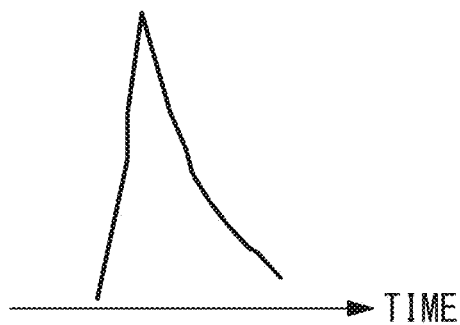
FIG. 3B is a view showing an example of an attenuating triangle-like pulse.
Figure 3C:
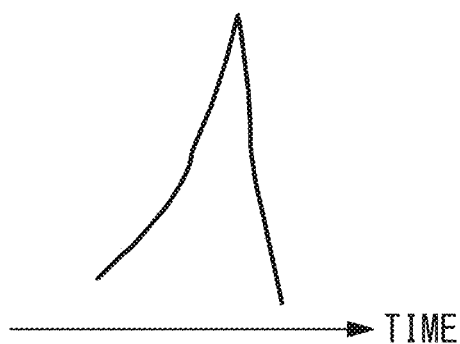
FIG. 3C is a view showing an example of an augmenting triangular pulse.
Figure 3D:
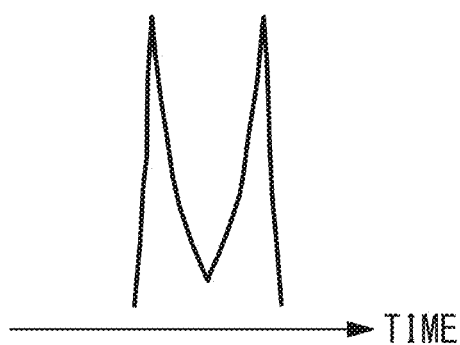
FIG. 3D is a view showing an example of an M-shaped pulse.

The pulse to be shaped is, for example, a square pulse train shown in FIG. 3A, an attenuating triangle-like pulse, an augmenting triangular pulse, and an M-shaped pulse shown in FIGS. 3B, 3C, and 3D, respectively, or a combination pulse thereof. A repetition frequency is preferably 1.7 kHz or more and 3.0 kHz or less. For example, the repetition frequency may be 1.7 kHz or more and 2.0 kHz or less, or may be 2.5 kHz or more and 3.0 kHz or less. For example, a function generator (WF1974, NF) can be used to generate the pulse shape. When a relatively low power laser beam is required, the repetition frequency of 1.7 kHz or more and 2.0 kHz or less is selected, and when a relatively high power laser beam is required, the repetition frequency of 2.5 kHz or more and 3.0 kHz or less is selected.

Next, as shown in a flowchart of FIG. 4, the laser lithotripsy method according to the present embodiment includes, for example, step S1 of oscillating the laser beam, step S2 of irradiating the urinary stone S in the solution W with the oscillated laser beam, step S3 of adjusting the repetition frequency of the pulse train to a frequency that synchronizes with a period in which the bubble B in the solution W is generated and which indicates behavior including generation and disappearance of the bubble B, and step S4 of irradiating the urinary stone S with a laser beam having a pulse train with a fixed period.

It is preferable that step S3 is performed in a light guiding process from the time when the laser beam is oscillated from the laser beam source 21 (step S1) to the time when the laser beam is irradiated from the fiber tip (step S4).

Operations of the laser lithotripsy system 1 and the laser lithotripsy method according to the present embodiment will be described below.

In a case of crushing the urinary stone S in the solution W using the laser lithotripsy system 1 and the laser lithotripsy method according to the present embodiment, after the optical fiber 23 is connected to the optical fiber connection unit 25, the distal end 23a of the fiber is disposed toward the urinary stone S. Then, a distance from the distal end 23a of the fiber to the urinary stone S is maintained within a predetermined range. The fiber identification information is sent from the optical fiber connection unit 25 to the waveform control unit 27.

For example, in order to maintain the distal end 23a of the fiber at a position within 3 mm from the urinary stone S, information such as an image displayed on the display unit 7 gives to the user that the distal end 23a of the fiber deviates from the predetermined range when exceeding 3 mm. Thereby, the user moves the laser lithotripsy apparatus 3 in the ureter until reaching the predetermined range.

On the other hand, while the laser lithotripsy apparatus 3 moves within the predetermined range by the user's operation, the display unit 7 gives that the laser lithotripsy apparatus is within an appropriate range or gives nothing. Similarly, when the laser lithotripsy apparatus 3 is within the predetermined range, even when a patient moves or the laser lithotripsy apparatus 3 relatively moves due to body movement such as breathing, the display unit 7 gives nothing. The distance from the distal end 23a of the fiber to the proximal end of the urinary stone S can be measured by a laser beam, for example, using a Time of Flight (ToF) method disclosed in PCT International Publication No. 2020/021590.

Next, the aiming light is emitted from the distal end 23a of the fiber toward the urinary stone S. Further, a laser beam is generated from the laser beam source 21. The oscillated laser beam is incident on the optical fiber 23 through the optical fiber connection unit 25. The laser beam guided by the optical fiber 23 is emitted from the distal end 23a of the fiber toward urinary stone S.

Next, an image of the urinary stone S is generated by the ureteroscope 5, and the generated image is displayed on the display unit 7. The user sets a waveform of the laser beam with the waveform setting unit 13 based on the ureteroscope image displayed by the display unit 7. The waveform setting unit 13 sets the waveform of the laser beam selected by the user. The waveform information indicating the set waveform is sent from the waveform setting unit 13 to the waveform control unit 27.

Further, the image information extraction unit 9 extracts the scattered light intensity of the aiming light in the urinary stone S based on the generated ureteroscope image. Then, the transmittance calculation unit 11 calculates transmittance of the aiming light from the extracted scattered light intensity, and waveform control information is generated based on the calculated transmittance. The generated waveform control information is sent to the waveform control unit 27.

The waveform control unit 27 acquires the desired waveform information from the waveform information storage unit 15 based on at least one of the fiber identification information sent from the optical fiber connection unit 25, the waveform information sent from the waveform setting unit 13, and the waveform control information sent from the transmittance calculation unit 11, and the oscillation of the laser beam source 21 is controlled based on the acquired waveform information.

Specifically, the laser beam emitted from the laser beam source 21 is adjusted to a pulse train of a frequency at which the laser beam is irradiated during a period overlapping with the generation period in which the bubble B is generated in the solution W until immediately before the bubble B disappears after being generated in the solution W by the laser beam, and in which the irradiation of the laser beam is stopped during a period overlapping with a disappearance period until the bubble B disappears immediately after the generation period and can be generated again.

Here, the waveform control unit 27 collates a transmission waveform obtained when the transmittance calculation unit 11 acquires a start time at which a sudden decrease starts after the transmittance reaches almost 100% and a time at which the transmittance starts to increase after decreasing with a waveform of the laser beam oscillated from the laser beam source 21. Then, the waveforms of the laser beam are matched in a large time zone in which the overlap of these waveforms is substantially maximized. In this way, adjustment is made to synchronize the laser beam having an arbitrary repetition frequency with the bubble behavior, and as a result, the time of high transmission is longest while the laser beam is irradiated. The adjustment of the laser beam by the waveform control unit 27 is preferably continuously performed until the urinary stone S to be crushed becomes sufficiently small in size.

As a result, for example, as shown in FIG. 2, the bubble B is generated at the distal end 23a of the fiber (a state of (a) in FIG. 2) when the laser beam is emitted from the distal end 23a of the fiber. Then when the bubble B couples the distal end 23a of the fiber and the urinary stone S (a state of (b) in FIG. 2) by the growth of the bubble B, the laser beam emitted from the distal end 23a of the fiber reaches the urinary stone S by passing through the bubble B (a state of (c) in FIG. 2).

Subsequently, when the bubble B is cooled by the solution W and turns to contraction, the irradiation of the laser beam is temporarily stopped in synchronization with the contraction of the bubble B (a state of (d) in FIG. 2).

After the bubble B disappears, the laser beam is emitted again from the distal end 23a of the fiber. Then, the bubble B couples the distal end 23a of the fiber and the urinary stone S by the growth of the bubble B, the laser beam passes through the bubble B, and thus the urinary stone S is irradiated again with the laser beam.

Similarly, the laser beam is repeatedly turned on and off according to the growth and disappearance cycle of the bubble B.

There is an advantage that a time required for a treatment can be shorten by the irradiation of the laser beam following disappearance of the bubble.

Then, when the urinary stone S is repeatedly irradiated with the laser beam, the urinary stone S is crushed by a steam explosion due to a temperature rise caused when the energy of the laser beam is absorbed in the water in the urinary stone S, or a thermochemical change due to absorption of the energy of the laser beam caused by the urinary stone S itself.

As described above, according to the laser lithotripsy apparatus 3, the laser lithotripsy system 1, and the laser lithotripsy method, the waveform control unit 27 adjusts the repetition frequency of the laser beam, with which the urinary stone S is irradiated, to the frequency at which the laser beam is irradiated during the generation period in which the bubble B is generated in the solution W until immediately before the bubble B disappears after being generated in the solution W and at which the laser beam is stopped during the disappearance period until the bubble B disappears can be generated again after the bubble B disappears, whereby the energy of the laser beam can be transmitted to the urinary stone S without waste.

Figure 5:
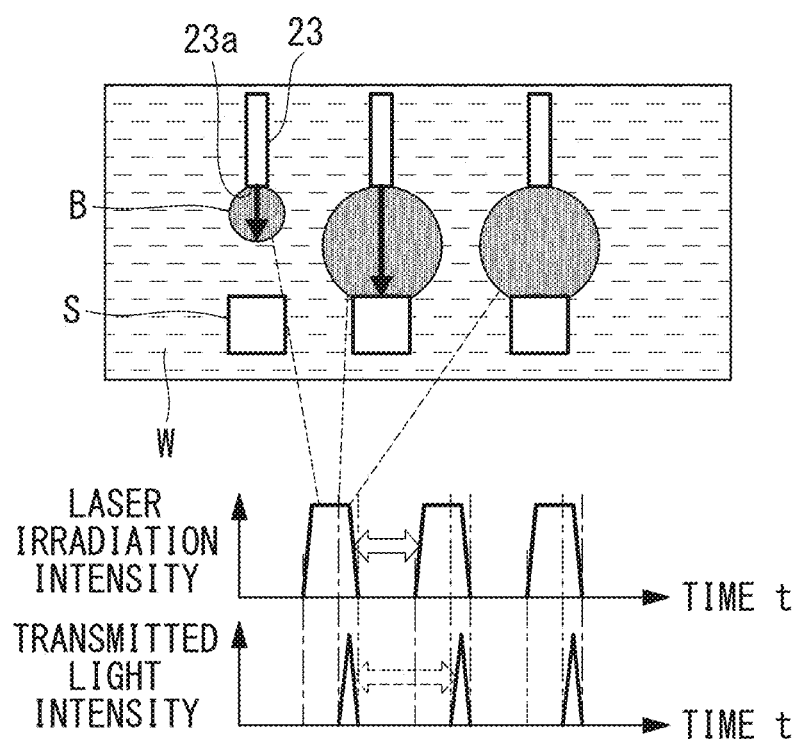
FIG. 5 is a view illustrating a relation between a laser irradiation intensity and a transmitted light intensity when a repetition frequency of a laser beam is fast.

As Comparative Example of an aspect of the present embodiment, a case will be described in which the repetition frequency of the laser beam is faster compared with the period indicating the behavior including the generation and disappearance of the bubble B. In this case, for example, as shown in FIG. 5, the irradiation of the laser beam is stopped during the bubble B couples the distal end 23a of the fiber and the urinary stone S. For this reason, the period during which the energy of the laser beam can be transmitted to the urinary stone S cannot be sufficiently utilized, and processing efficiency is reduced.

Figure 6:
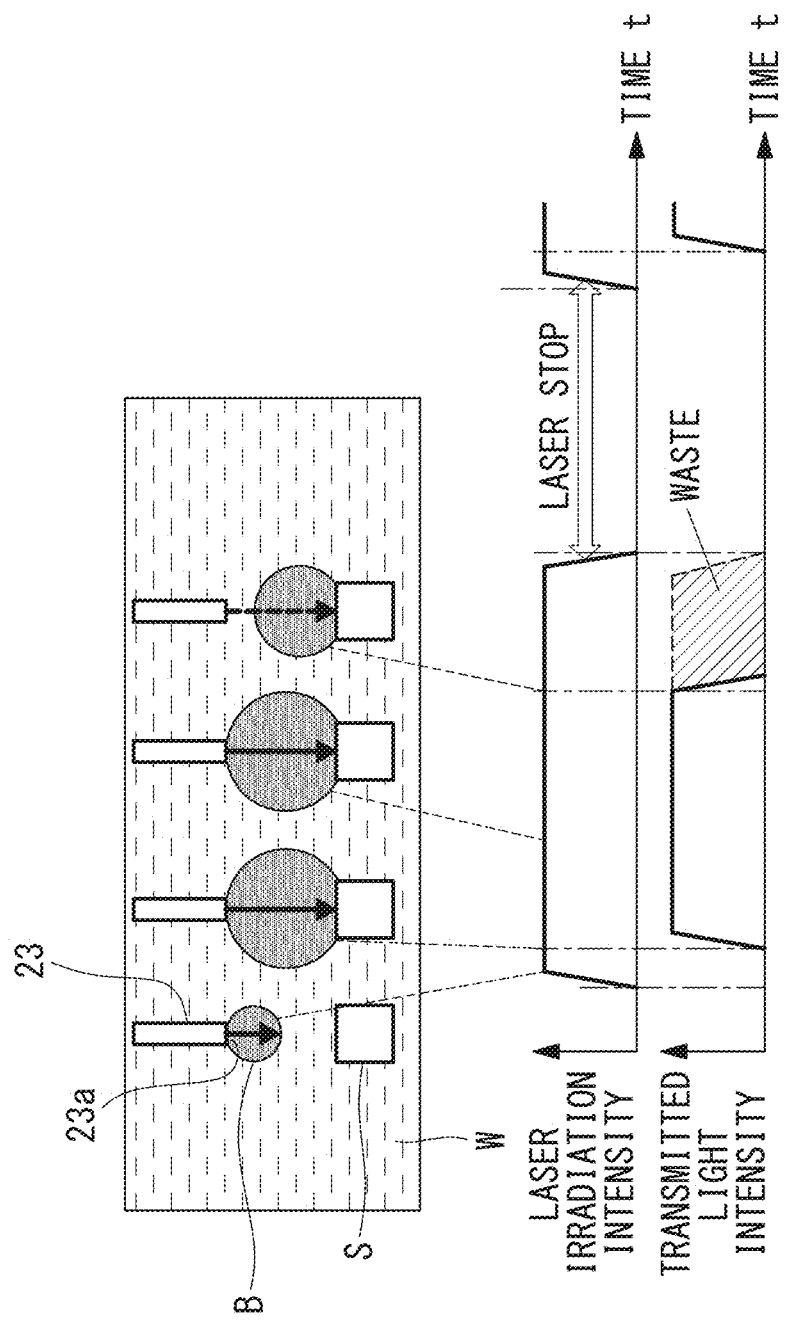
FIG. 6 is a view illustrating a relation between a laser irradiation intensity and a transmitted light intensity when a repetition frequency of a laser beam is slow.

Further, as Comparative Example of an aspect of the present embodiment, a case will be described in which the repetition frequency of the laser beam is slower compared with the period indicating the behavior including the generation and disappearance of the bubble B. In this case, for example, as shown in FIG. 6, the laser beam is continuously emitted even during the bubble B begins to move away from the distal end 23a of the fiber due to contraction. For this reason, the laser beam is continuously emitted during the period in which the laser beam does not reach the urinary stone S, and the energy of the laser beam is wasted.

In the present embodiment, since the transmittance of the scattered light intensity of the aiming light change in the state of the generation of the bubble B and the state of disappearance of the bubble B, the transmittance is calculated from a correlation between the scattered light intensity and the transmittance. Alternatively, scattered light of illumination light of an endoscope may be used.

In addition, an optical sensor may be disposed at a laser irradiation position through an access sheath (not shown), to directly monitor the intensity of the transmitted light of the laser beam.

The present embodiment can be modified into the following configurations.

Figure 7:
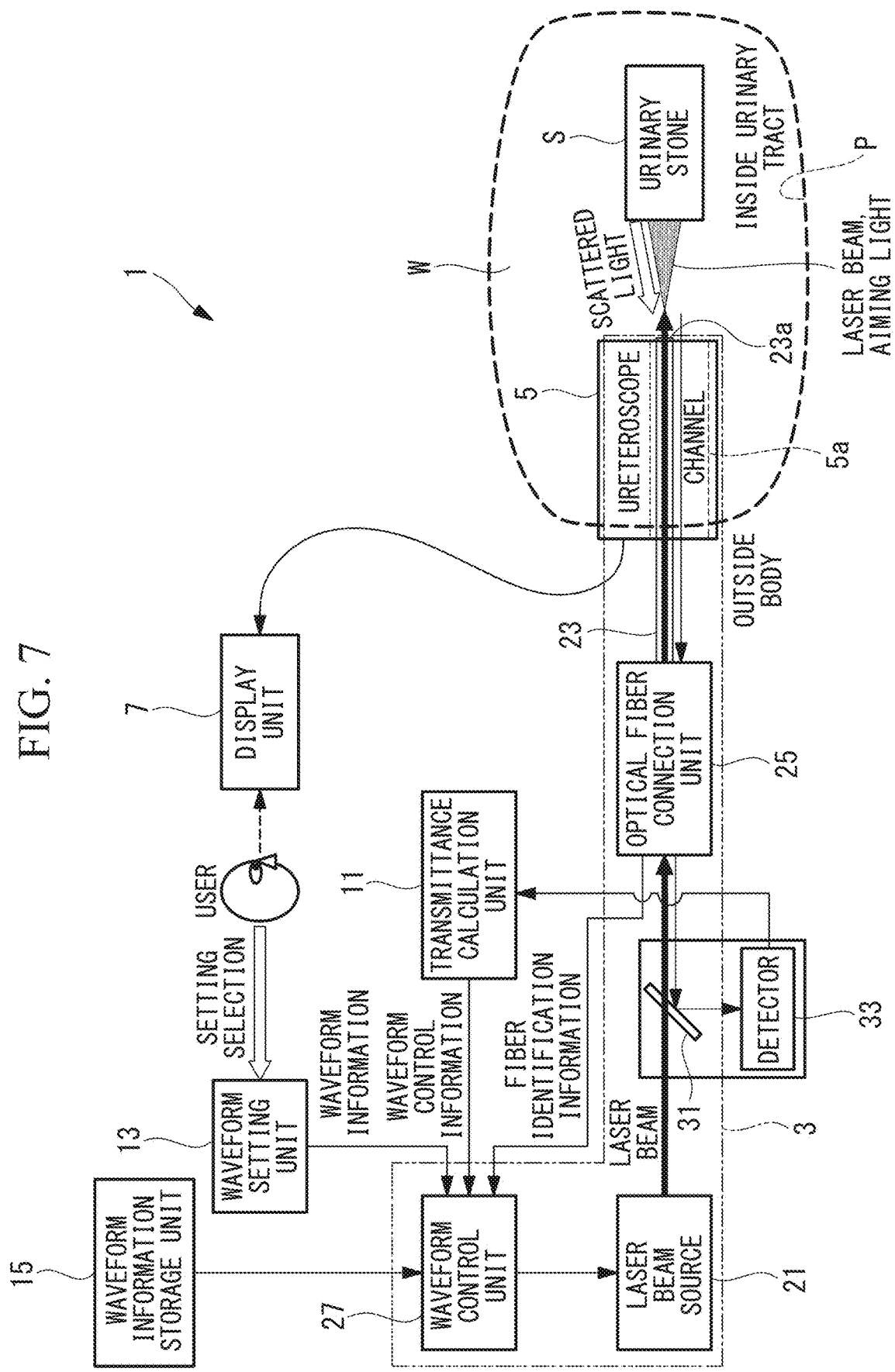
FIG. 7 is a schematic block diagram of a laser lithotripsy system according to a first modification of the embodiment of the present invention.

As a first modification, for example, as shown in FIG. 7, the laser lithotripsy system 1 may include a scattered light separation unit 31 such as a dichroic mirror and a detector 33. Further, the laser lithotripsy system 1 may not include the image information extraction unit 9. The scattered light separation unit 31 is disposed on an optical path of the laser beam between the laser beam source 21 and the optical fiber connection unit 25.

In this modification, the scattered light of the aiming light in the urinary stone S is collected by the optical fiber 23, and then returns to the optical path of the laser beam in a reverse direction. Therefore, the scattered light returning to the optical path of the laser beam in the reverse direction may be separated from the laser beam by the scattered light separation unit 31, and intensity of the scattered light separated by the scattered light separation unit 31 may be detected by the detector 33. Then, the transmittance calculation unit 11 may calculate the transmittance of the aiming light based on the intensity of the scattered light detected by the detector 33.

Figure 8:
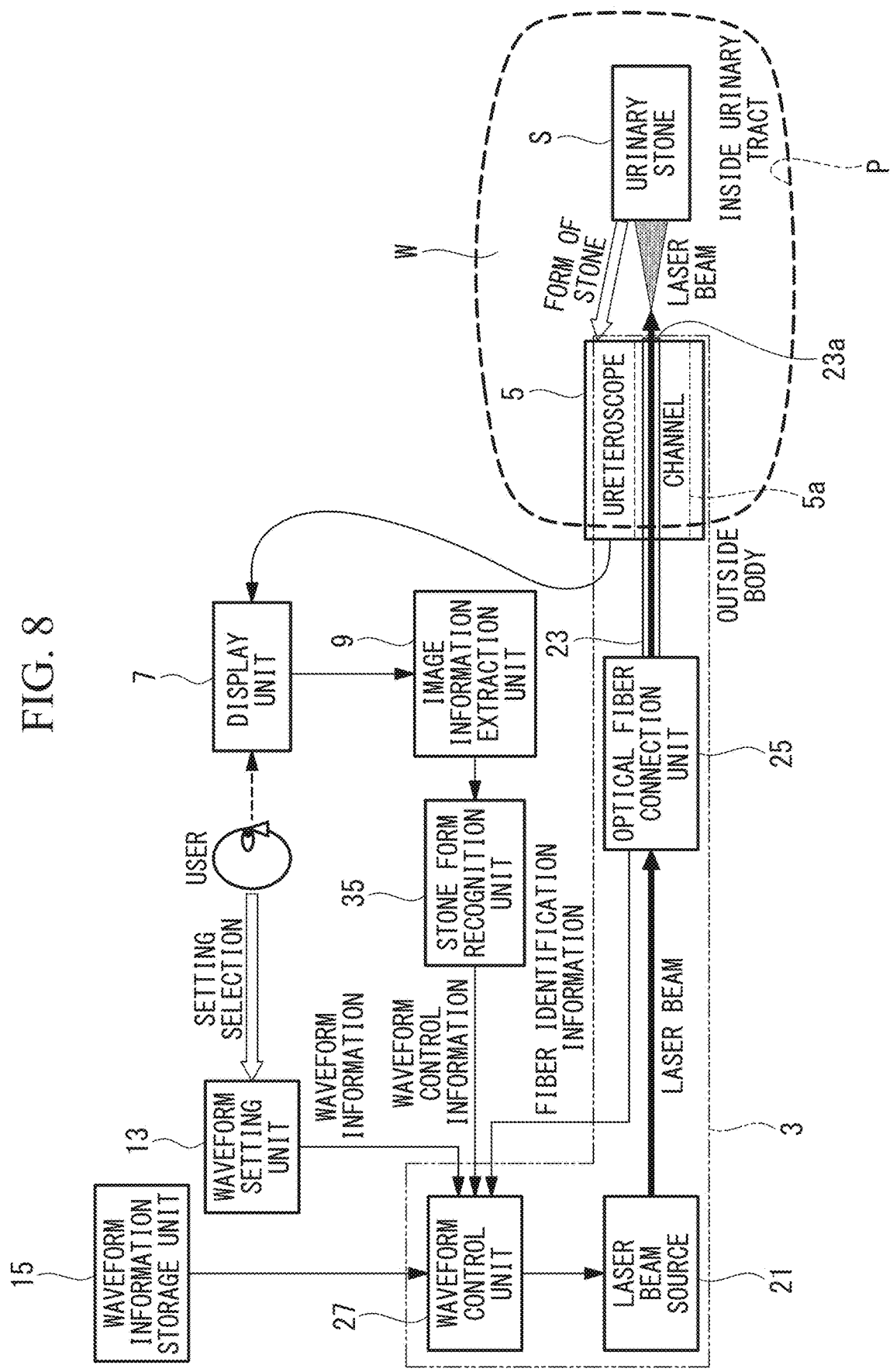
FIG. 8 is a schematic block diagram of a laser lithotripsy system according to a second modification of the embodiment of the present invention.

As a second modification, for example, as shown in FIG. 8, the laser lithotripsy system 1 may include a stone form recognition unit (arithmetic operation unit) 35 instead of the transmittance calculation unit 11. Further, the image information extraction unit 9 may extract a form of the stone based on the ureteroscope image.

In this modification, the stone form recognition unit 35 may generate waveform control information by recognizing the form of the urinary stone S extracted by the image information extraction unit 9. Then, the waveform control information generated by the stone form recognition unit 35 may be sent to the waveform control unit 27.

In this modification, based on the form of the urinary stone S extracted by the image information extraction unit 9, for example, the crushed state, the stone form recognition unit 35 may calculate a contact state between the bubble B and the urinary stone S. Examples of the contact state may include whether the bubble B and the urinary stone S are in contact with each other, and a contact time in the case of being in contact with each other.

In addition, the stone form recognition unit 35 may calculate the distance between the distal end 23a of the fiber and the urinary stone S based on the contact time between the bubble B and the urinary stone S. The display unit 7 may display the contact state between the bubble B and the urinary stone S calculated by the stone form recognition unit 35 and the distance between the distal end 23a of the fiber and the urinary stone S.

In the embodiment and the modifications described above, the irradiation of the laser beam is stopped during the disappearance period of the bubble B. Alternatively, the output of the laser beam may be reduced to an amount that does not cause the temperature rise of the solution W without stopping the irradiation of the laser beam. Even in this case, the energy of the laser beam can be prevented from being useless. Here, the amount of laser beam not causing the temperature rise means, for example, a small output not causing bubble formation in which the liquid such as water between the fiber tip and the stone is irrigated during the disappearance period of the bubble such that the temperature does not drop too much to prevent heat shock. The small output capable of being applied during such a bubble disappearance period can be one tenth or less, and preferably one hundredth or less of the output of the laser beam at the time of the generation of the bubble.

The embodiment and the modifications described above indicate the example of application to the ureter, but an endoscope may be used to acquire an image from any organ that can cause stones in the body, such as a bile duct or a kidney. The laser lithotripsy according to compositions of the stone generated in each organ is preferably performed while looking at the image. The aspect of the laser lithotripsy apparatus using an endoscope may refer to the international application No. PCT/JP2019/007928, entitled Lithotripsy apparatus and Lithotripsy system. According to the distance measurement technique disclosed in this international application, the distance to the stone can be accurately determined even in the presence of a fluctuating bubble generated between the laser tip and the stone.

EXAMPLE

Examples of the laser lithotripsy apparatus, the laser lithotripsy system, and the laser lithotripsy method according to the above-described embodiment will be described below.

(Laser Lithotripsy Method)

A treatment method for urinary stones which is regarded as a current golden standard is a laser lithotripsy (fURS or fTUL). The laser lithotripsy is a method of irradiating a stone (crushing target) with a laser beam to absorb the laser beam to the stone and to raise the temperature of the stone and crushing the stone.

In this method, it is important how to deliver efficiently the beam to the stone. Conventionally, a Ho: YAG laser has been used for fURS, but a high-power holmium YAG (Ho: YAG) laser for lithotripsy is very large in terms that a water cooling apparatus is required. On the other hand, a Tm fiber laser (TFL) is attracting attention that operates by air cooling. It has been reported that the TFL has better lithotripsy efficiency than the Ho: YAG.

The Ho: YAG oscillates at 2100 nm and the TFL oscillates at 1940 nm (a typical value), but these wavelengths are strongly absorbed by water. For this reason, when the Ho: YAG and the TFL are used for treatment in the body, the distance will be limited that the laser beam reaches.

(Transmittance Measurement)

Figure 9:
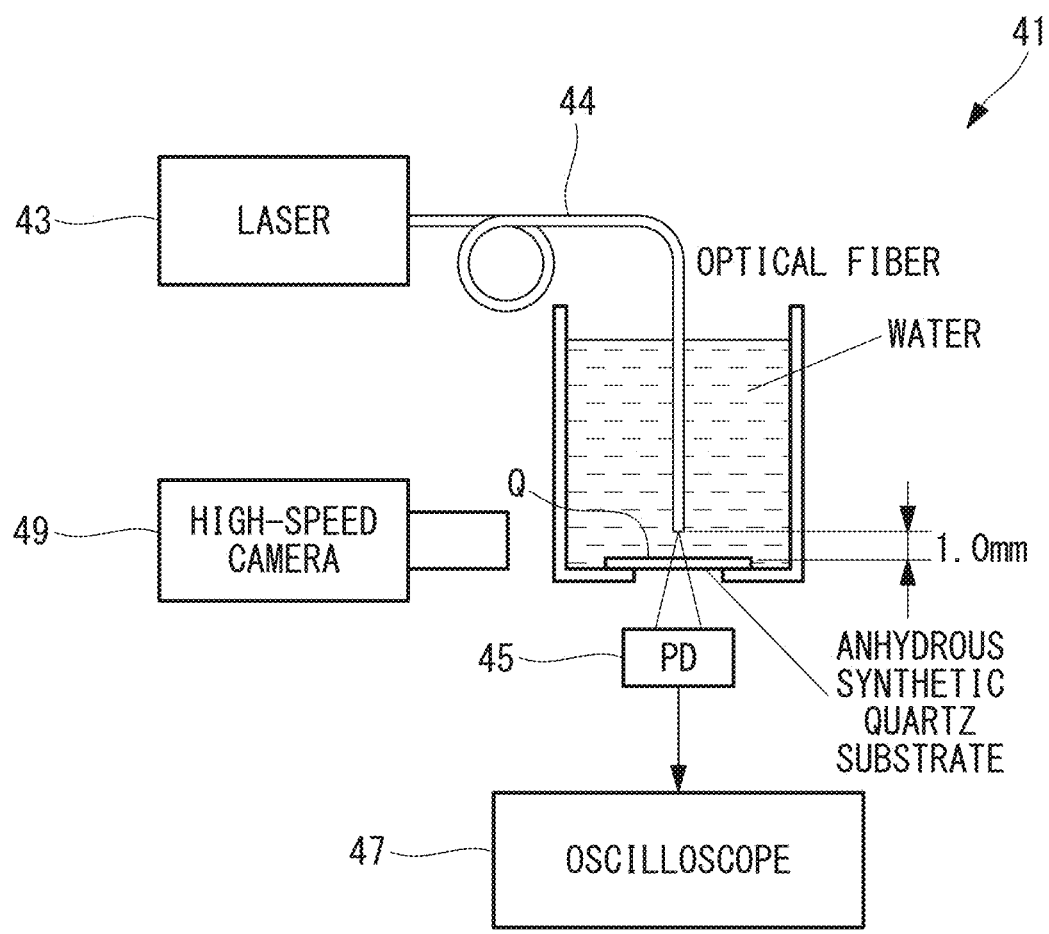
FIG. 9 is a schematic block diagram of a measuring apparatus used for transmittance measurement.

An output waveform of a laser 43 and a waveform of the laser after water penetration were measured by a measuring apparatus 41 shown in FIG. 9 using a photodiode (PD) 45. In FIG. 9, reference numeral 44 indicates an optical fiber, and reference numeral 47 indicates an oscilloscope. Measurement results are shown in FIGS. 10A and 10B. FIG. 10A shows an output waveform of the laser beam, and FIG. 10B shows a waveform of the laser beam after water penetration. In FIGS. 10A and 10B, a vertical axis indicates intensity (Intensity), and a horizontal axis indicates a time (time).

Figure 11:
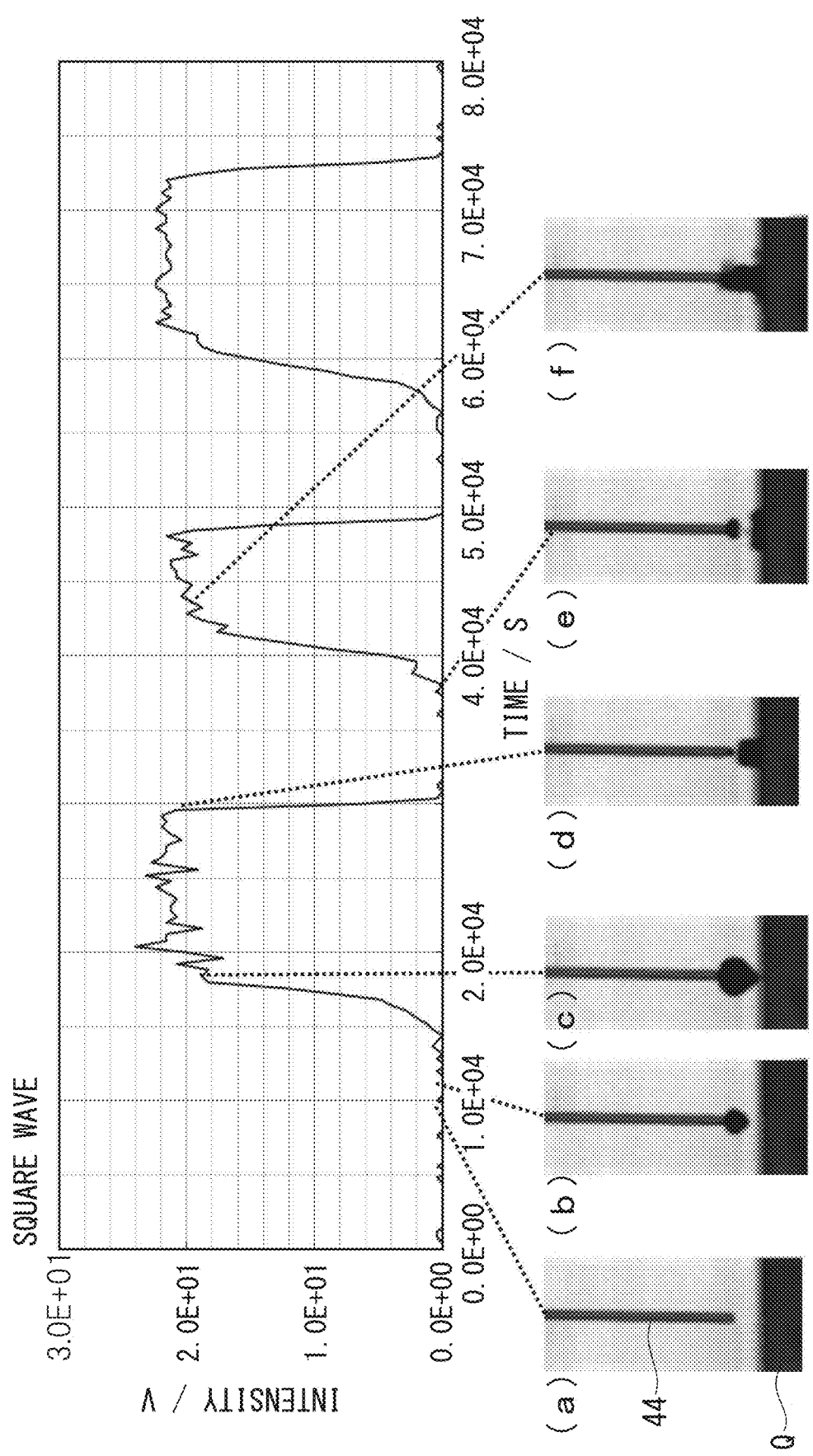
FIG. 11 is a view illustrating a correlation between the waveform after water transmission of a laser beam and a bubble.

When an output waveform of a square wave was measured through water, the result was obtained that the intensity changed almost regularly. A correlation between such a transmission waveform and a bubble photographed by a high-speed camera (Fast Cam) 49 was investigated. Results of investigation are shown in FIG. 11. An upper stage of FIG. 11 shows a waveform obtained by cutting out an initial time zone of irradiation in FIG. 10B. Parts of (a) to (f) in FIG. 11 show shapes of bubbles at each time of the waveform indicated by a dotted line.

(Bubble Observation)

As shown in FIG. 9, a bubble formation process of each pulse was photographed and recorded using a high-speed digital camera (Fast Cam) 49. A photographing speed was 100,000 frames/sec.

In FIG. 9, which is a schematic block diagram of the measuring apparatus used for the transmittance measurement, the shape of the bubble was also measured using the measuring apparatus 41. From a back surface of a cell in which an optical fiber 44 was installed, a photographing region was illuminated by a Kohler illumination using a halogen lamp as a light source. Bubbles appear as shadows in images taken by the camera. The observed bubble images were shown in the parts of (a) to (f) in FIG. 11.

In a time domain shown in the part of (a) in FIG. 11, a bubble starts to be generated immediately after the output of the laser beam. However, in a time domain shown in the part of (b) in FIG. 11, since the bubble is being generated and the bubble has not yet reached a quartz substrate Q on the bottom surface, the intensity of the transmitted light remains zero. In a time domain shown in the part of (c) in FIG. 11, when the bubble comes into contact with the quartz substrate Q due to further growth of the bubble, light is transmitted through the bubble for the first time.

In a time domain shown in the part of (d) in FIG. 11, when the bubble is cooled by the surrounding water and turns into contraction, the transmission of light is interrupted. According to the part of (e) in FIG. 11, it can be seen that the bubble and the tip of the optical fiber 44 are separated from each other in a time domain in which the light is not transmitted. In a time domain shown in the part of (f) in FIG. 11, when the bubble reaches the quartz substrate Q due to the growth of the bubble again, the light is transmitted again.

As shown in FIG. 11, it was found that there is a correlation between the intensity of the transmitted light and the size of the bubble. Then, the time domain in which the bubble shown in the part of (e) in FIG. 11 disappears is a dead time during which the irradiating energy does not reach the stone, and the irradiation in the time domain shown in the part of (e) in FIG. 11 is useless.

In this Example, a method is provided in which the laser beam is stopped at the timing of the bubble disappearance and thus the energy is efficiently supplied to the stone. In other words, a method is provided in which the laser intensity is modulated in synchronization with the generation and disappearance of the bubble, and thus the energy is efficiently supplied to the stone.

(Principle Verification)

Figure 12:
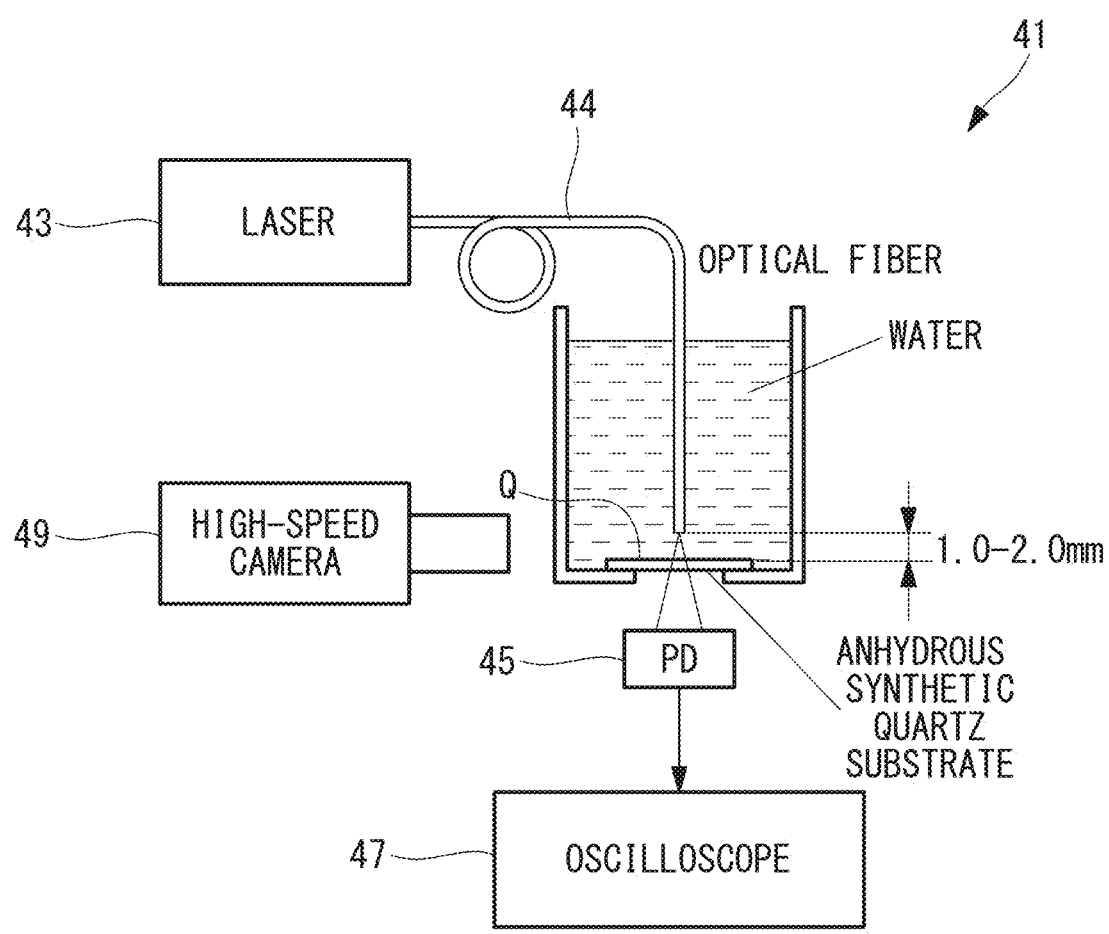
FIG. 12 is a schematic block diagram of a measuring apparatus used for measuring a change in transmittance.
Figure 13:
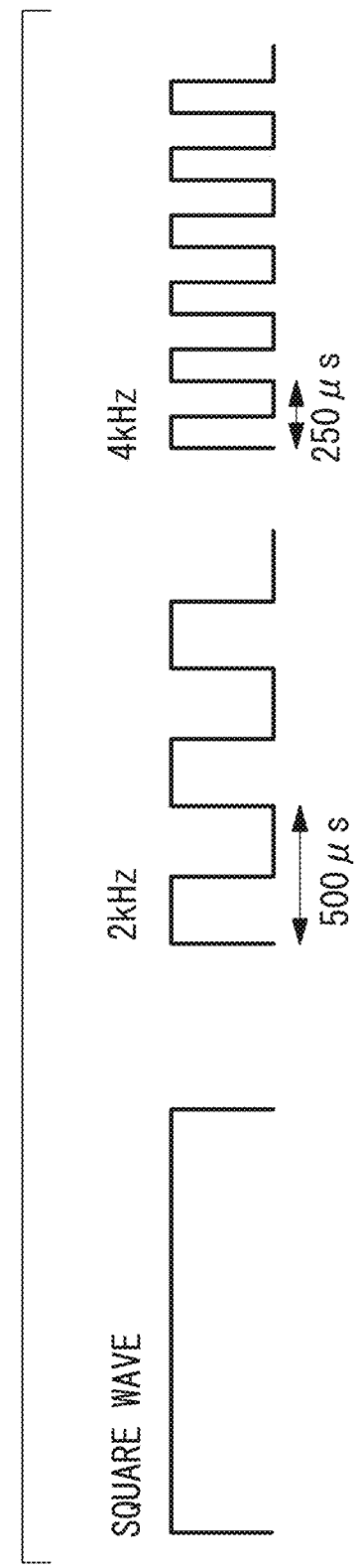
FIG. 13 is a view showing an example of a pulse train frequency used for measuring a change in transmittance.

In the measuring apparatus 41 shown in FIG. 12, the distance from the tip of the optical fiber 44 to the quartz substrate Q was set to 1.0 mm, 1.5 mm, and 2.0 mm for the purpose of verifying the effect on the synchronization of the bubble generation and the pulse control. Then, at each of the distances, the pulse train frequency (pulse train frequency, PT frequency) was changed and thus the transmittance of the laser beam was measured as shown in FIG. 13.

By the change in the distance from the tip of the optical fiber 44 to the quartz substrate Q, a water thickness can be changed. At each distance and each frequency, the transmitted light intensity was divided by the intensity of water thickness 0, and thus the transmittance of the laser beam was calculated. A calculation result is shown in FIG. 14.

Figure 14:
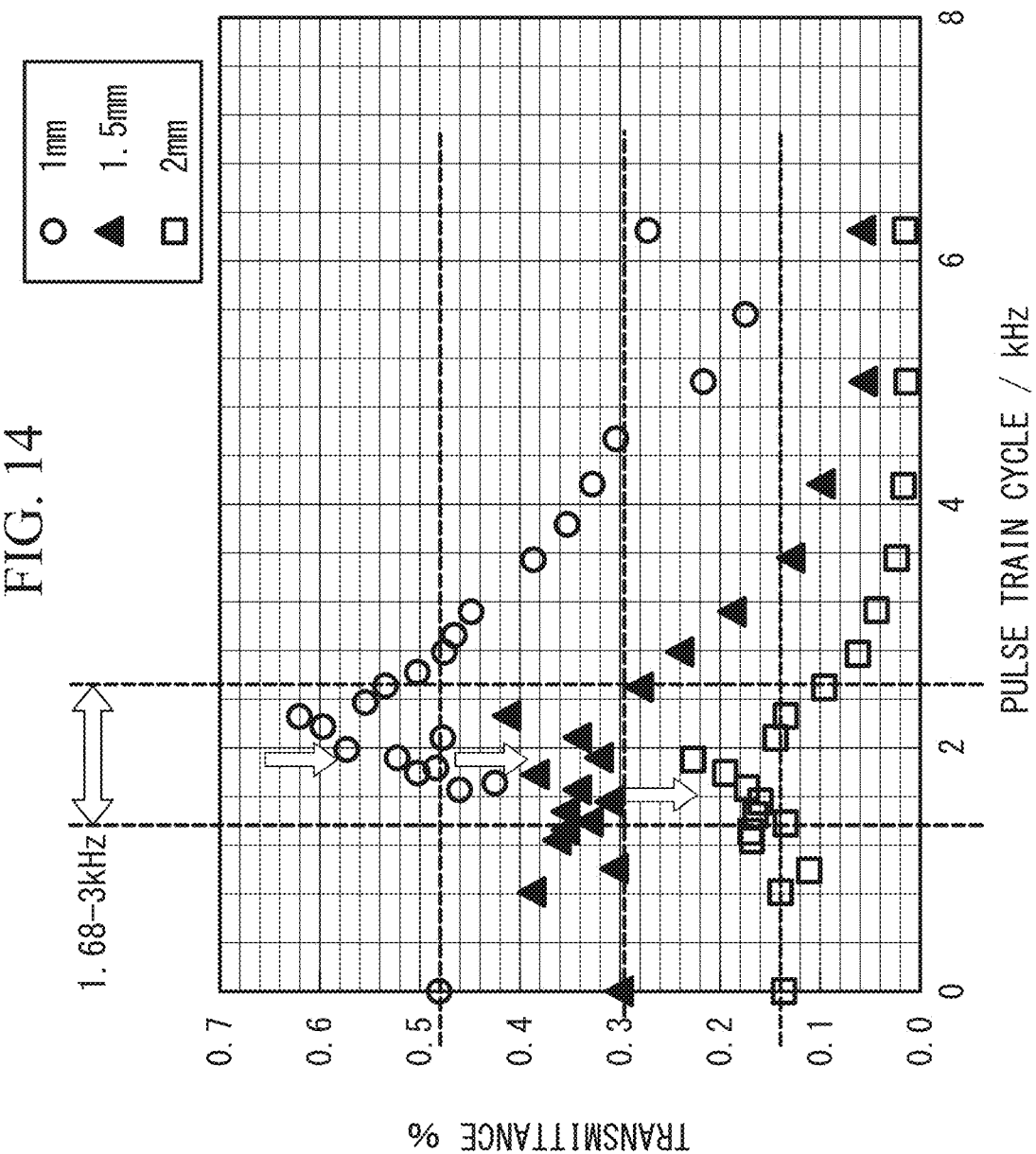
FIG. 14 is a view illustrating a relation between the pulse train frequency and the transmittance.

In FIG. 14, circles (○), triangles (Δ), and squares (□) indicate transmittances when the water thickness is 1.0 mm, 1.5 mm, and 2.0 mm, respectively. Further, a vertical axis indicates a transmittance (Transmittance) of the laser beam, and a horizontal axis indicates a pulse train frequency (PT frequency). The transmittance of the square wave was plotted at frequency 0 for convenience.

Frequency dependence was observed for the transmittance at each water thickness, and it was found that there was a frequency at which the transmittance indicated by a white arrow was maximum. In FIG. 14, the transmittance of the square wave is shown by a dotted line, and a part above the dotted line corresponds to a frequency at which the transmittance is increased by the pulse train. The maximum frequency was not almost dependent on the water thickness. Therefore, the pulse train frequency is set to a frequency of 1.68 to 3 kHz shown in the drawing, and thus the transmittance can be improved.

FIGS. 15A, 15B, 15C, and 15D show an output waveform (CH1) and a water transmission waveform (CH2) of a square wave and pulse train frequencies of 1.67 kHz, 2.27 kHz, and 6.25 kHz, respectively. In each of time domains indicated by white arrows in FIG. 15B, it is seen that the output waveform is sustained, but the transmission waveform is attenuated. This is the same as the case of the square wave of FIG. 15A, and the irradiation energy in this time domain does not reach the stone and is useless. On the other hand, in FIG. 15D, since the output waveform is interrupted before the bubble frows, the transmission waveform intensity is not sufficiently increased.

In FIG. 15C where the transmittance is maximized, the output waveform is attenuated in synchronization with a timing at which the transmission waveform is attenuated, that is, a timing at which the bubble disappears. In this way, it has been found that the pulsed state of the laser beam is changed according to the form of the bubble generated in the liquid by the energy of the laser beam, and thus the transmittance of the laser beam irradiated toward the stone can be adjusted. This makes it possible to efficiently reach the stone with the laser beam, especially by controlling the waveform of the pulse train in synchronization with the disappearance of the bubble.

Figure 15A:
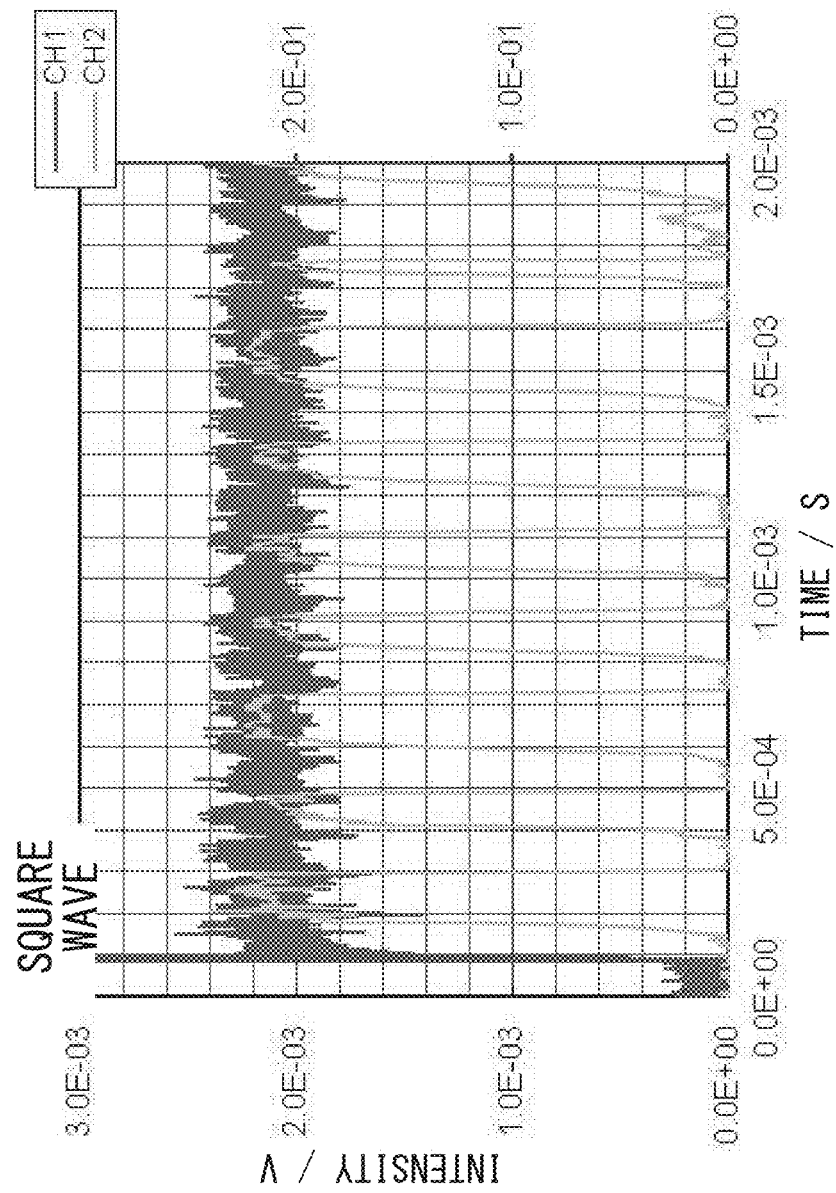
FIG. 15A is a view illustrating a relation between an output waveform and a water transmission waveform of a laser beam of a square wave.
Figure 15B:
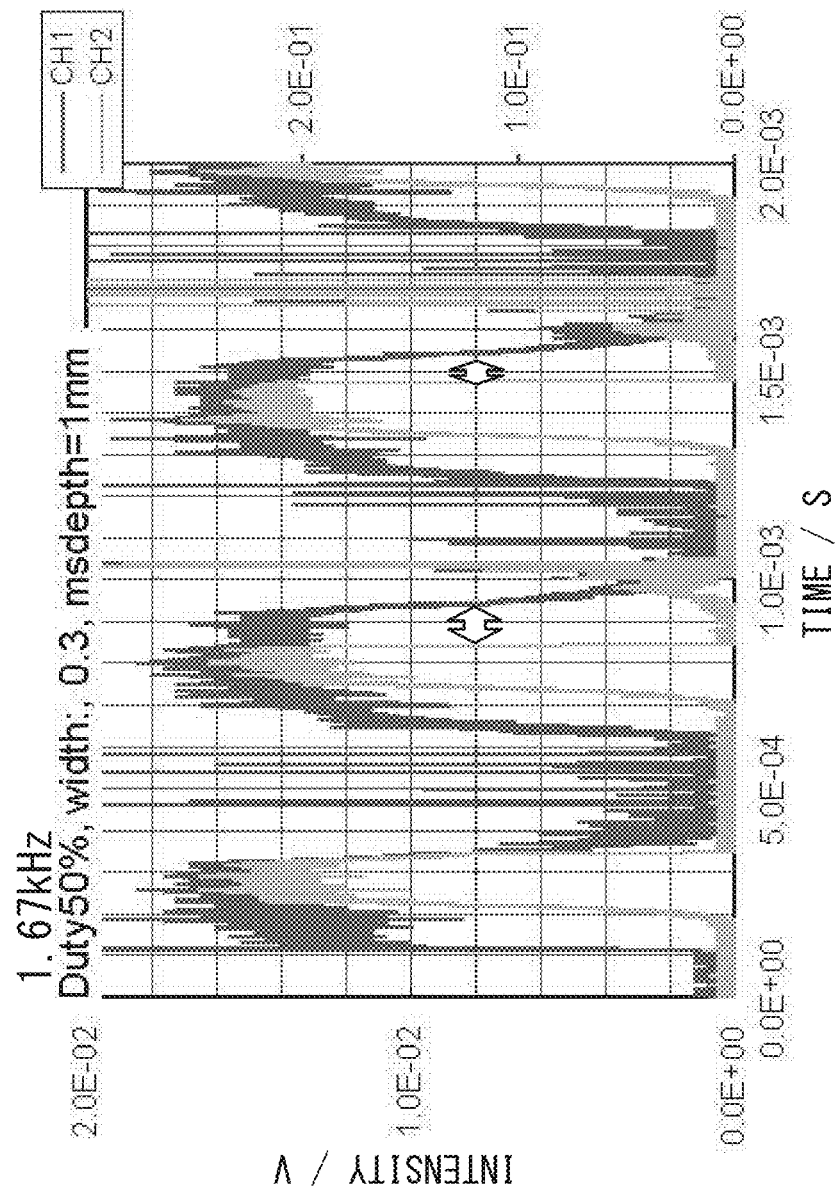
FIG. 15B is a view illustrating a relation between an output waveform and a water transmission waveform of a laser beam with a pulse train frequency of 1.67 kHz.
Figure 15D:
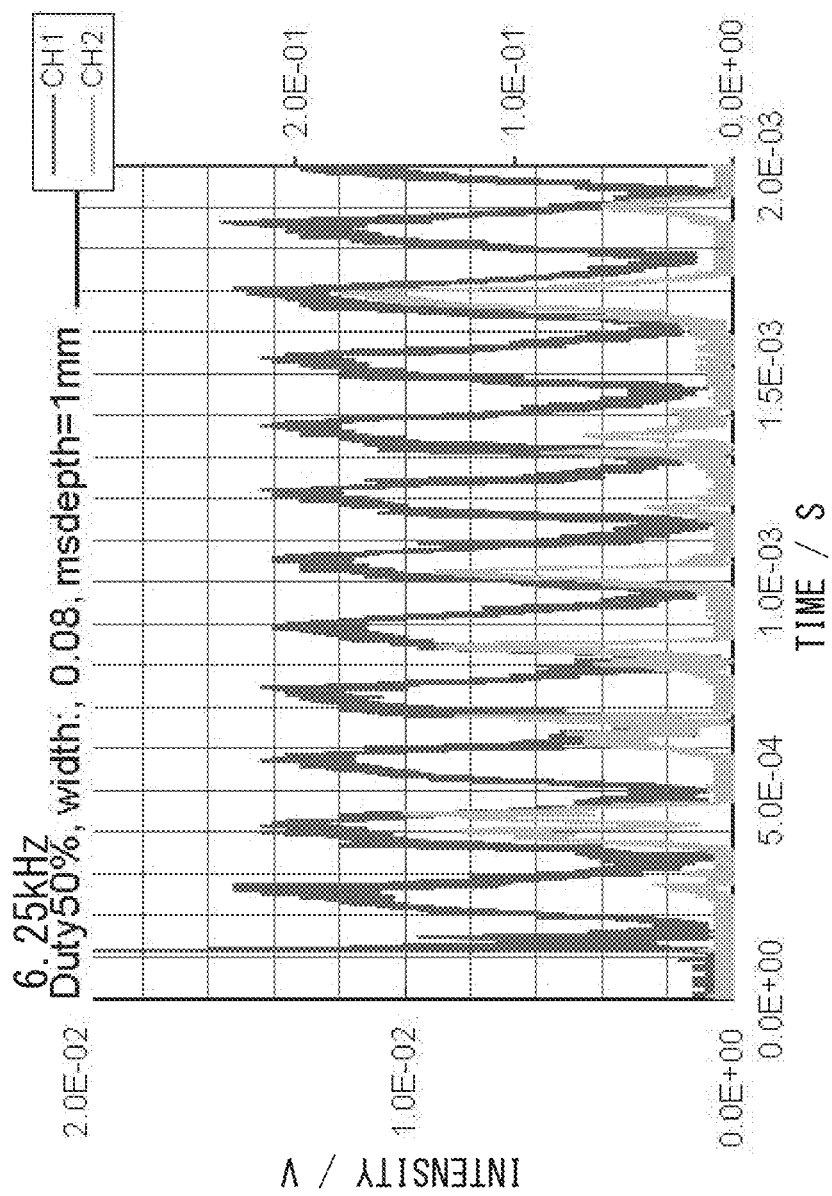
FIG. 15D is a view illustrating a relation between an output waveform and a water transmission waveform of a laser beam with a pulse train frequency of 6.25 kHz.

When the pulse frequency is low, that is, when the pulse irradiation time is long and the pulse stop time is long, the bubble changes from expansion to contraction, and the energy of the laser beam emitted while the bubble is contracting is absorbed by water, whereby the transmittance is low. In FIG. 15A, the pulse frequency is 1.67 kHz. When the pulse frequency is high, that is, when the pulse irradiation time is short and the pulse stop time is short, the growth of the bubble is insufficient, or the laser beam is irradiated before the bubble disappears. For this reason, incomplete bubbles are generated, resulting in low transmittance. In FIG. 15D, the pulse frequency is 6.25 kHz.

Therefore, the transmittance can be increased by repeatedly performing a manner of irradiating the laser beam during the bubble generated in the water by the laser irradiation is expanding, stopping or attenuating the laser irradiation when the bubble changes from expansion to contraction, and starting and augmenting the laser irradiation after the bubble completely disappears.

Specifically, as shown in FIG. 14, the pulse train frequency is set to the frequency of 1.68 to 3.0 kHz, and thus the transmittance can be improved.

FIGS. 9 to 15D are based on the measurement results under conditions of a laser wave height of 500 W, a fiber core diameter of 272 μm, a fiber NA of 0.65, and an emission NA of 0.1. The frequency of the optimum pulse train can be optimized by these conditions. The optical fiber used herein is HLFDBX0270c, manufactured by Dornier MedTech.

In addition, FIGS. 9 to 15D show results that a duty ratio of the pulse train, that is, a ratio at the time of pulse generation and interval is 50%. The frequency of 1.67 kHz corresponds to a pulse width of 300 μs and an interval of 300 μs. The maximum frequency of 2.27 kHz corresponds to a pulse width of 220 μs and an interval of 220 μs. The frequency of 3 kHz corresponds to a pulse width of 167 μs and an interval of 167 μs. The interval may be changed when the next pulse is generated at the optimum timing in synchronization with the generation of pulse. When the pulse width is equal and the interval is changed, the frequency range naturally shifts from the above range.

Further, even when a condensing optical system such as a convex lens or a ball lens is mounted on the fiber tip in order to improve a spatial density of the laser, the laser beam differs in energy density and divergence angle. For this reason, a modulation frequency of the pulse train can optimize the pulse width and the interval according to the energy density and the divergence angle of the laser beam.

Figure 16:
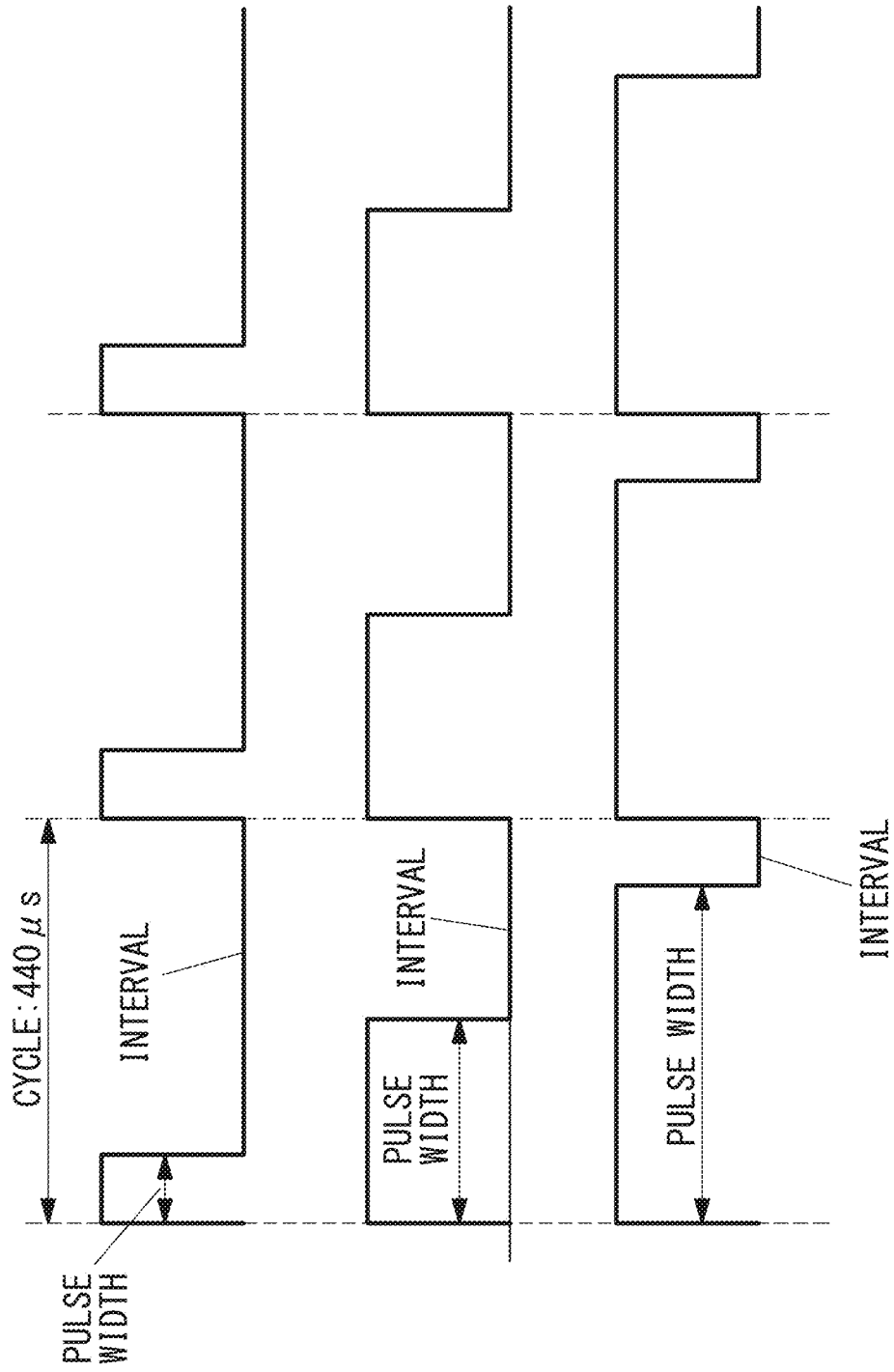
FIG. 16 is a view showing an example of a pulse width and an interval of the laser beam with the pulse train frequency of 2.27 kHz.

FIGS. 16 and 17 show transmittances measured at 2.27 kHz (pulse and interval cycle of 440 μs) with different duty ratios. In this case, the maximum was shown when the duty ratio was 50%, and the transmittance was higher than that of the square wave (Rectangle).

FIGS. 18A, 18B, 18C, 18D, and 18E show an output waveform (CH1) and a water transmission waveform (CH2) at each duty ratio.

Figure 18A:
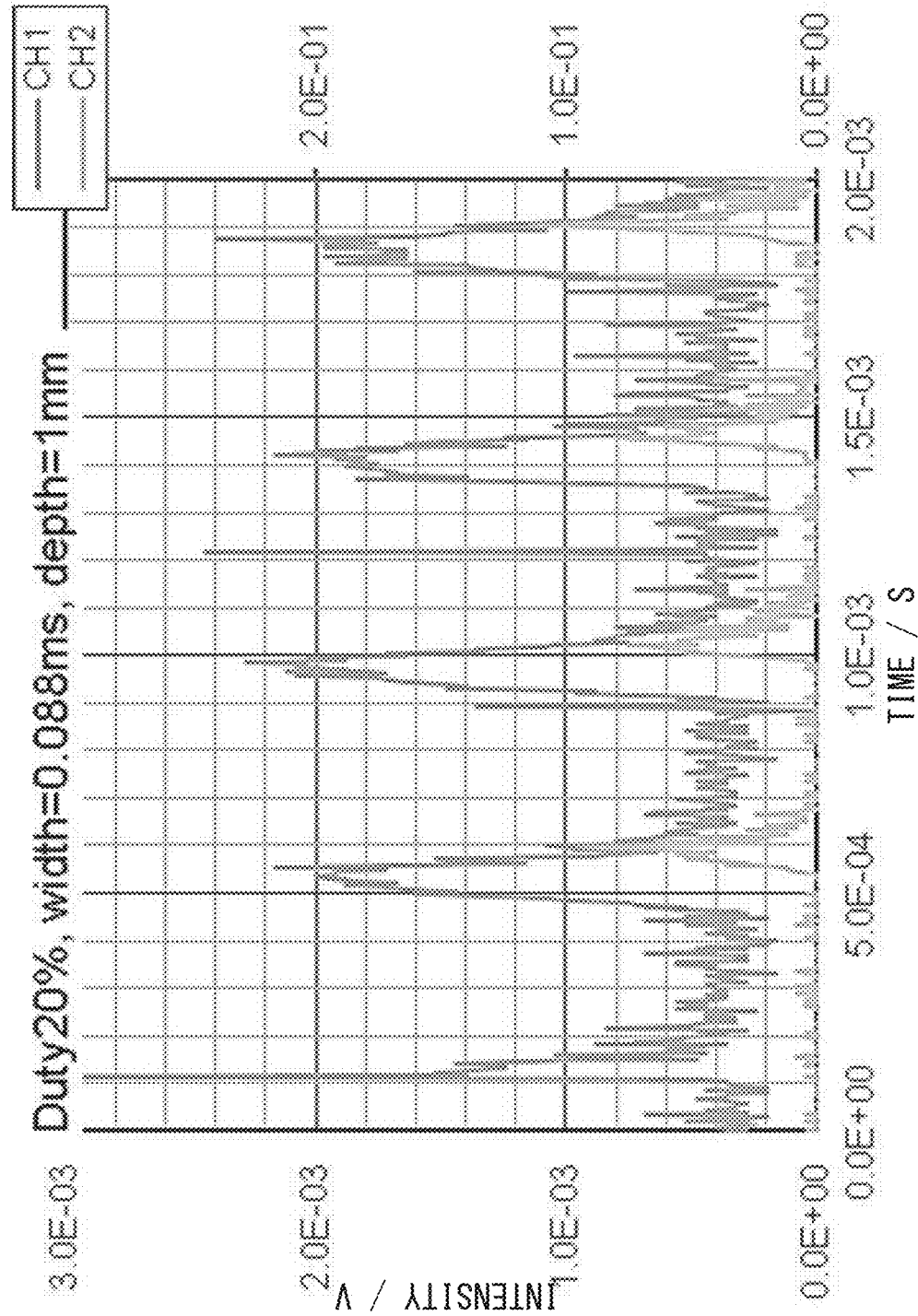
FIG. 18A is a view showing an example of a transmittance when a duty ratio is 20%.
Figure 18C:
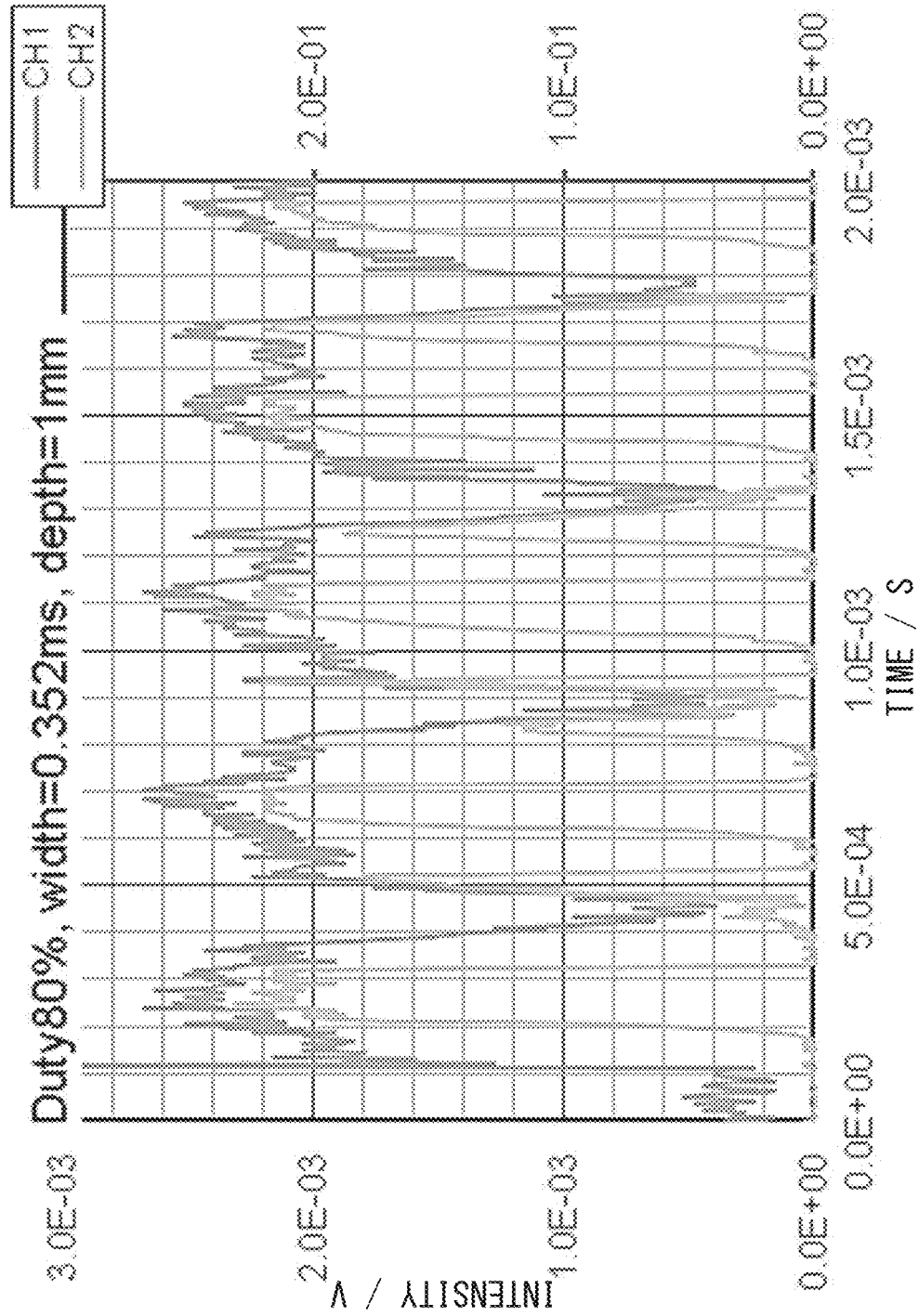
FIG. 18C is a view showing an example of a transmittance when a duty ratio is 80%.
Figure 18D:
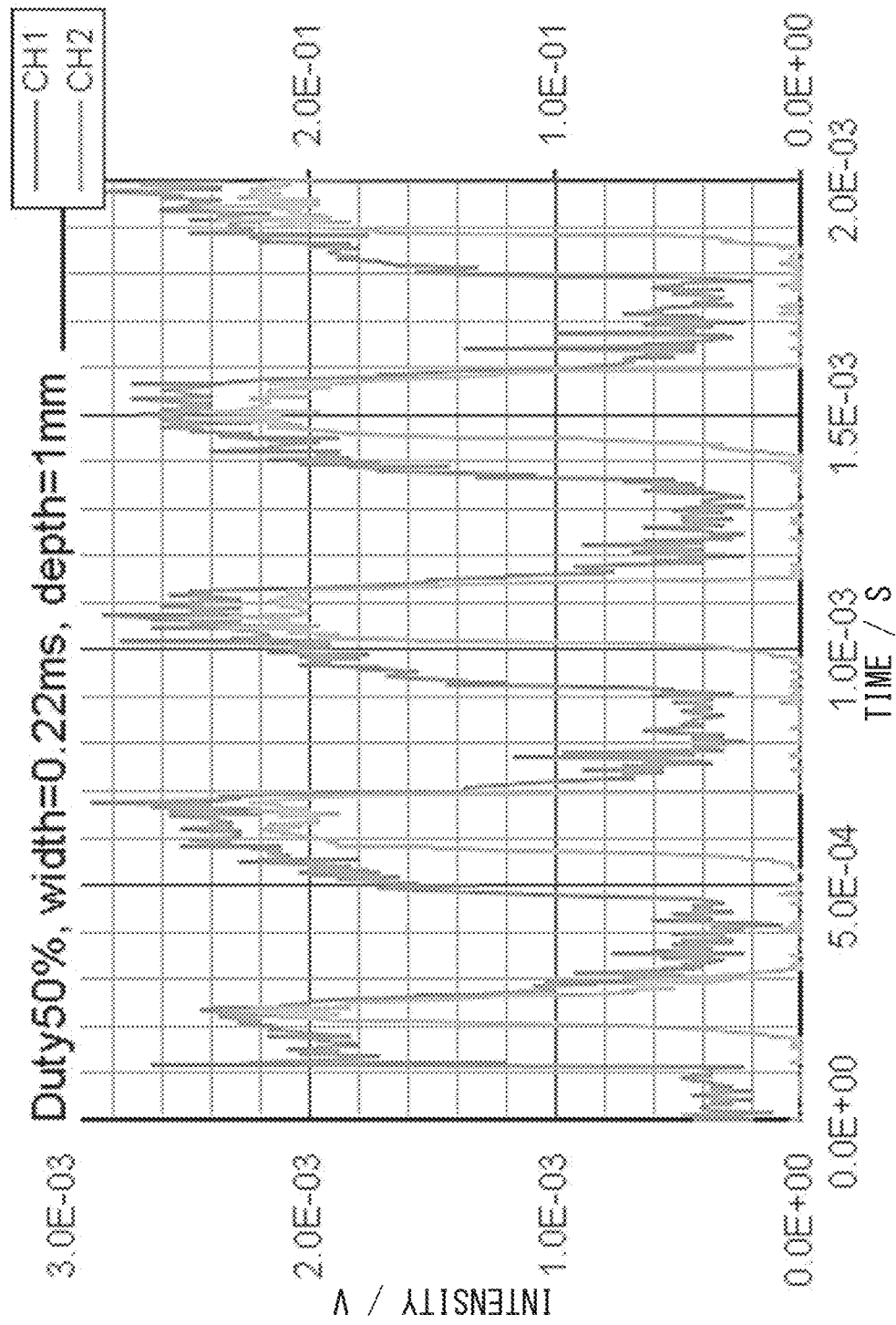
FIG. 18D is a view showing an example of a transmittance when a duty ratio is 50%.
Figure 18E:
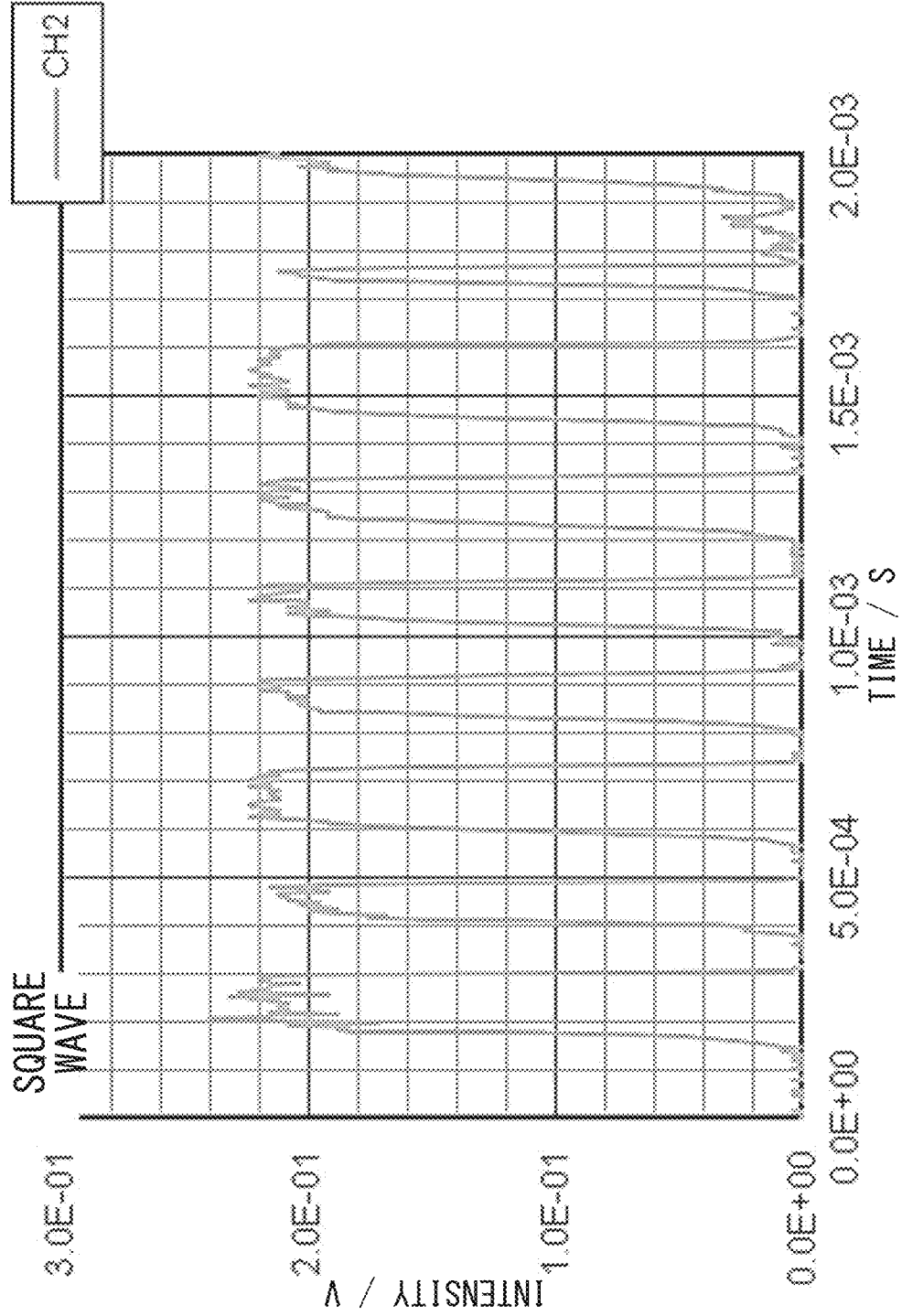
FIG. 18E is a view showing an example of a transmittance in a case of a square wave.
Figure 19:
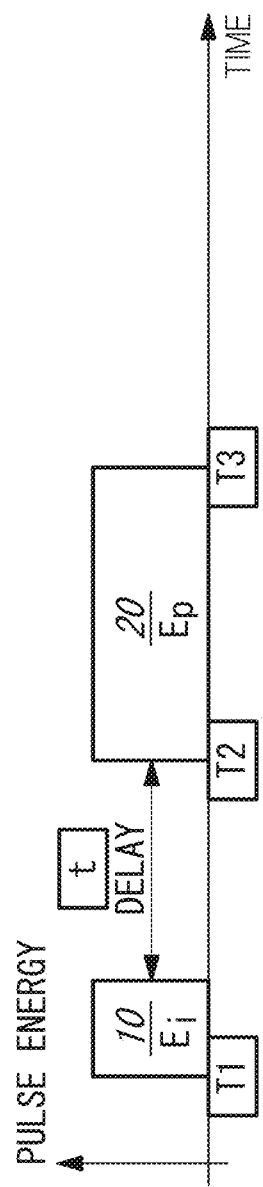
FIG. 19 is a view illustrating PTL 1.
Figure 21:
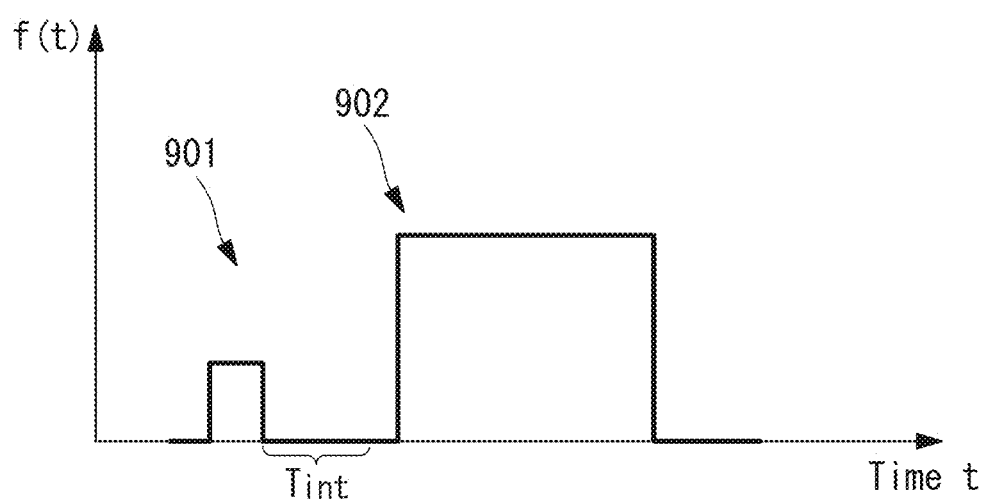
FIG. 21 is a view illustrating PTL 2.

As shown in FIG. 18A, since the pulse width is narrow at a duty ratio of 20%, the pulse stops before the bubble is completely generated. For this reason, the transmittance is poor. On the contrary, as shown in FIG. 18B, when the duty ratio is lengthened (duty ratio 60%), since the bubble disappears while the pulse continues, useless irradiation occurs. Further, as shown in FIG. 18C, since the laser output continues even when the duty ratio is 80% and the bubble disappears, the output during this period is useless. On the other hand, as shown in FIG. 18D, when the duty ratio is 50%, since the pulse is stopped in synchronization with the disappearance of the bubble, the transmittance is improved. FIG. 18E shows an output waveform in a case of a square wave (Rectangle). In general, more efficient irradiation can be made when the duty ratio is 40% to 60% compared with a conventional method of waiting for the bubble to disappear spontaneously by intervals, and it has been suggested that the most effective irradiation can be achieved when the duty ratio is preferably 45% to 55%.

Example

In this Example, a crushing laser system is provided in a treatment apparatus in which TFL light for lithotripsy is guided from the proximal end to the distal end by an optical fiber to irradiate a stone with the guided laser beam passing through urine, water, a saline solution, any aqueous solution, or an organic solution, the crushing laser system being characterized in a TFL pulse train is generated and a pulse train frequency is set to 1.68 to 3.0 kHz to control laser oscillation in synchronization with the generation and disappearance of the bubble.

According to this Example, the pulse train frequency is set regardless of the distance from the distal end of the optical fiber to the stone, whereby the transmitted light intensity can be increased with respect to a normal square wave, and the light intensity reaching the stone can be increased.

The oscillation intensity and the frequency of the TFL are controlled by an electric pulse intensity of a function generator and a control signal generator of a frequency signal. When the TFL is oscillated based on the control signal, a desired pulse train output is obtained. The TFL pulse train is guided from the proximal end to the distal end using the optical fiber and irradiates the stone through an aqueous solution or an organic solution. Since the pulse train frequency is set regardless of the distance of the stone, the energy reaching the stone can be improved, and the lithotripsy efficiency can be improved.

{First Modification}

In Example described above, as shown in FIG. 3A, a pulse control means generates a pulse shape having a square shape, which is a pulse train shape. Alternatively, the pulse shape may be replaced with a pulse having a shape shown below, or may be a combination of a pulse having a shape shown below and a pulse having a square shape.

For example, as shown in FIG. 3B, the pulse may have an attenuating triangle-like shape in which the intensity changes from a strong state to a weak state. Further, as shown in FIG. 3C, the pulse may have an augmenting triangle-like shape in which the intensity changes from a weak state to a strong state.

Further, when the pulse having the attenuating triangle-like shape and the pulse having the augmenting triangle-like shape are alternately oscillated, the action of each pulse shape may be substantially caused.

In addition, when the pulse having the attenuating triangle-like shape and the pulse having the augmenting triangle-like shape are combined as one pulse shape, an M-like shape is formed as shown in FIG. 3D, and thus the action of both the pulse shapes may be caused at the same time.

Further, when the pulses having the plurality of shapes are changed according to the dimensions, the size, and the distance of the stone which is a crushing target, the stone may be efficiently crushed. For example, when the stone is not floating in the urinary tract before or during crushing, the pulse having the square shape may be used. Further, when the stone is floating in the urinary tract, the pulse having the M-like shape or the augmenting triangle-like shape may be used.

By using the pulse having such a shape, the shape of the bubble generated by the laser irradiation changes, and the water steam changes due to the bubble. This makes it possible to prevent the movement of the stone and guide the position of the stone on the laser irradiation axis.

{Second Modification}

In this Example, the output wavelength of the TFL is assumed to be 1940 nm, but the oscillation wavelength may change depending on the TFL housing. In this case, since the absorption intensity of water changes, the bubble differs in generation time and disappearance time. Therefore, a second modification may include a step of optimizing the pulse train frequency depending on the TFL oscillation wavelength.

Further, in order to crush the stone by efficiently injecting the energy into the stone itself and raising the temperature of the stone, it is preferable to select a wavelength having a large absorption intensity of the stone component, particularly water. Therefore, it is preferable to use a laser that oscillates at an absorption wavelength of water (near 2 μm, near 3 μm, and near 1.5 μm, including a tolerance of ±400 nm, respectively).

In this case, since the laser beam is absorbed by water as in the case of TFL, the bubble is generated by laser irradiation. Therefore, even when these wavelengths are used, the transmittance can be improved by modulation of the laser intensity in synchronization of the timing of generation and disappearance of the bubble. Since the frequency of modulation depends on the absorption intensity of water, a step may be included in which an appropriate frequency is selected according to the wavelength.

Further, a step may be included in which the pulse train frequency is optimized by identification of housing information of the TFL.

In addition, since the generation time and the disappearance time of the bubble depend on the time and the spatial density of the laser beam at the distal end of the fiber, the optimum frequency of the pulse train changes as the fiber core diameter and the divergence angel (or NA) change. This Example may a step in which the pulse train frequency is set depending on the diameter of the fiber to be used.

For this reason, a step may be included in which characteristic values of the fiber used in this Example are arbitrarily input and the pulse train frequency is set based on the input characteristic values of the fiber. Further, a step may be included in which the fiber is automatically identified by the mounting of the fiber and thus the pulse train frequency is set based on the acquired characteristic values of the fiber.

Further, similarly to the above, the time and the spatial density of the laser beam at the distal end of the fiber also change depending on the oscillation peak value of the TFL, that is, the energy intensity at each time. For this reason, a step may be included in which the pulse train frequency is set based on the oscillation peak value of the TFL arbitrarily set by the user or the oscillation peak value of the TFL that can be selected as a setting item of the housing.

In this Example and each modification, the urinary stone to be crushed is described as an example, the effect of pulse train is not limited to the urinary stone treatment, but can be obtained for bile duct stone as well. Further, it is also useful to improve the laser transmission in procedures that use the laser beam in the water, the aqueous solution, or the organic solution. For this reason, this Example is not limited to the urinary stone, and can be applied to the treatment of any biological tissue. In other words, the above-described embodiment and Example is not limited to the stone as a crushing target, and can be applied to lesions that can be crushed by the laser beam. Further, the crushing target is not limited to a substance generated in the body, but may be unnecessary substance that can be crushed by the laser beam in a state approached by using an endoscope.

Although the embodiment of the present invention has been described in detail with reference to the drawings, the specific configuration is not limited to such an embodiment, and includes design changes within a range that does not deviate from the scope of the present invention. For example, the present invention is not limited to the embodiment and the modification described above, and may be embodiments in which these embodiment and the modification are appropriately combined without being limited particularly. The present invention is applicable to various types of endoscopes other than a ureteroscope, such as a urethroscope, a cystoscope, a cholangioscope, a hysteroscope, a duodenum endoscope or a digestive tract endoscope.

The following aspects can be also derived from the embodiments.

A first aspect of the present invention provides a laser lithotripsy apparatus including: a pulse generation unit that pulses a laser beam oscillated from a laser beam source; a repetition frequency adjustment unit that adjusts a repetition frequency of the laser beam pulsed by the pulse generation unit; and a laser emission end that emits the laser beam adjusted by the repetition frequency adjustment unit to a crushing target in a liquid, wherein the repetition frequency adjustment unit adjusts the repetition frequency to a frequency that synchronizes with a period in which a bubble is generated in the liquid and which indicates behavior including generation and disappearance of the bubble.

According to the above aspect, the laser beam pulsed by the pulse generation unit is emitted from the laser emission end, and the crushing target in the liquid is irradiated with the laser beam, whereby the crushing target is crushed. The laser beam reaches the crushing target by passing through the bubble generated in the liquid by the laser beam and used as a waveguide.

In this case, the repetition frequency adjustment unit adjusts the repetition frequency of the pulse train of the laser beam, with which the crushing target is irradiated, to the frequency that synchronizes with the period in which the bubble is generated in the liquid and which indicates the behavior including the generation and disappearance of the bubble, whereby the waste of energy of the laser beam delivered to the crushing target can be prevented.

In the laser lithotripsy apparatus according to the aspect described above, the laser lithotripsy apparatus may further include a laser output change unit that changes an output of the laser beam, wherein the laser output change unit may reduce the output of the laser beam during a period in which the bubble disappears.

Since the laser beam is not transmitted when the bubble disappears, the waste of energy of the laser beam delivered to the crushing target can be prevented with the above configuration.

In the laser lithotripsy apparatus according to the aspect described above, the laser output change unit may turn on and off irradiation of the laser beam in synchronization with the repetition frequency.

A second aspect of the present invention provides a laser lithotripsy system including: a pulse generation unit that pulses a laser beam oscillated from a laser beam source; a repetition frequency adjustment unit that adjusts a repetition frequency of the laser beam pulsed by the pulse generation unit; a laser emission end that emits the laser beam adjusted by the repetition frequency adjustment unit to a crushing target in a liquid; an imaging unit that images the crushing target; and a display unit that displays the crushing target imaged by the imaging unit, wherein the display unit presents at least a screen allowing confirmation as to whether the bubble generated by the laser beam reaches the crushing target.

According to the present aspect, the laser beam pulsed by the pulse generation unit is emitted from the laser emission end, and the crushing target in the liquid is irradiated with the laser beam, whereby the crushing target is crushed. Further, the display unit displays the crushing target imaged by the imaging unit. The laser beam reaches the crushing target by passing through the bubble generated in the liquid by the laser beam and used as a waveguide.

In this case, the repetition frequency adjustment unit adjusts the repetition frequency of the pulse train of the laser beam, with which the crushing target is irradiated, to the frequency that synchronizes with the period in which the bubble is generated in the liquid and which indicates the behavior including the generation and disappearance of the bubble, whereby the waste of energy of the laser beam delivered to the crushing target can be prevented. Further, a user can easily grasp based on the screen presented by the display unit whether the bubble generated by the laser beam reaches the crushing target.

In the laser lithotripsy system according to the aspect described above, laser lithotripsy system may further include an arithmetic operation unit that calculates a contact state between the bubble and the crushing target based on a crushing state of the crushing target imaged by the imaging unit.

In the laser lithotripsy system according to the aspect described above, the arithmetic operation unit may calculate a distance between the laser emission end and the crushing target based on a contact time between the bubble and the crushing target.

In the laser lithotripsy system according to the aspect described above, the display unit may display a result calculated by the arithmetic operation unit.

With such a configuration, the user can easily grasp the distance between the laser emission end and the crushing target by visually recognizing the display unit.

A third aspect of the present invention provides a laser lithotripsy method including: irradiating a crushing target with a laser beam in a liquid having a pulse train with a fixed cycle; and adjusting a repetition frequency of the pulse train to a frequency that synchronizes with a period in which a bubble is generated in the liquid and which indicates behavior including generation and disappearance of the bubble.

According to the present aspect, the crushing target in the liquid is irradiated with the laser beam having the pulse train of the fixed cycle, and thus the crushing target is crushed. The laser beam reaches the crushing target by passing through the bubble generated in the liquid by the laser beam and used as a waveguide. Therefore, the repetition frequency of the pulse train of the laser beam, with which the crushing target is irradiated, is adjusted to the frequency that synchronizes with the period in which the bubble is generated in the liquid and which indicates the behavior including the generation and disappearance of the bubble, whereby the waste of energy of the laser beam delivered to the crushing target can be prevented.

In the laser lithotripsy method according to the aspect described above, the synchronizing frequency may be a frequency at which the laser beam is irradiated during a period overlapping with a generation period in which the bubble is generated in the liquid until immediately before the bubble disappears and at which generation of the bubble by the laser beam is suppressed during a period overlapping with a disappearance period starting when the bubble disappears immediately after the generation period until it is able to be generated again.

Since the laser beam is not transmitted when the bubble disappears, the energy of the laser beam is wasteful when the laser beam is irradiated during the disappearance period of the bubble. With the above configuration, the energy of the laser beam can be delivered to the crushing target without waste.

In the laser lithotripsy method according to the aspect described above, an output of the laser beam may be reduced to an amount that does not cause a temperature rise of the liquid, thereby suppressing the generation of the bubble.

In the laser lithotripsy method according to the aspect described above, an output of the laser beam may be set to zero, thereby suppressing the generation of the bubble.

In the laser lithotripsy method according to the aspect described above, the repetition frequency may be 1.7 kHz or more and 3.0 kHz or less. Further, the repetition frequency may be 1.7 kHz or more and 2.5 kHz or less. Further, the repetition frequency may be 2.5 kHz or more and 3.0 kHz or less. Here, it is possible to perform effective treatment while observing the state of stone crushing such that when a relatively low power laser beam is required, the repetition frequency range of 1.7 kHz or more and 2.0 kHz or less is selected, and conversely, when a relatively high power laser beam is required, the repetition frequency range of 2.5 kHz or more and 3.0 kHz or less is selected.

In the laser lithotripsy method according to the aspect described above, the laser lithotripsy method may further include irradiating with the laser beam in a state of maintaining a distance from an emission end, at which the laser beam is emitted, to the crushing target.

With such a configuration, the laser beam can efficiently reach the crushing target.

A fourth aspect of the present invention provides a laser lithotripsy method including: disposing a laser emission unit toward a crushing target existing in a liquid; and irradiating the crushing target with a pulsed laser beam from the laser emission unit, wherein the laser beam has a pulse train with a repetition frequency that synchronizes with a period in which a bubble is generated in the liquid and which indicates behavior including generation and disappearance of the bubble.

According to the present aspect, the crushing target is irradiated with the pulsed laser beam from the laser emission unit disposed toward the crushing target in the liquid, and thus the crushing target is crushed. The laser beam reaches the crushing target by passing through the bubble generated in the liquid by the laser beam and used as a waveguide. Therefore, the laser beam, with which the crushing target is irradiated, has the pulse train with the repetition frequency that synchronizes with the period in which the bubble is generated in the liquid and which indicates the behavior including the generation and disappearance of the bubble, whereby the waste of energy of the laser beam delivered to the crushing target can be prevented.

In the laser lithotripsy method according to the aspect described above, the laser lithotripsy method may further include maintaining a state in which a distance from an emission end of the laser emission unit to the crushing target is within a predetermined range.

With such a configuration, the laser beam can efficiently reach the crushing target.

In the laser lithotripsy method according to the aspect described above, the laser lithotripsy method may further include causing the laser beam to synchronize with the behavior of the bubble by adjusting a light transmission waveform due to a change in a light transmittance obtained between a time at which a sudden decrease starts after a light transmittance, which is a ratio at which the laser beam reaches the crushing target, reaches 100% and a time at which the light transmittance starts to increase after decreasing, and a waveform of the laser beam at a time zone in which overlapping with a pulse train waveform formed of a pulse train of the laser beam increases.

In the laser lithotripsy method according to the aspect described above, the repetition frequency may be switched between a low repetition frequency of 1.7 kHz or more and 2.5 kHz or less and a high repetition frequency of 2.5 kHz or more and 3.0 kHz or less.

In the laser lithotripsy method according to the aspect described above, a duty ratio of the pulse train may be 45% to 55%.

REFERENCE SIGNS LIST 1 laser lithotripsy system
3 laser lithotripsy apparatus
5 ureteroscope (imaging unit)
7 display unit
23 optical fiber (laser emission unit)
23a distal end (laser emission end) of fiber
27 waveform control unit (pulse generation unit, repetition frequency adjustment unit, laser output change unit)
35 stone form recognition unit (arithmetic operation unit)
B bubble
S urinary stone (crushing target)

The invention claimed is:

1. A waveform control device for a laser lithotripsy apparatus, comprising:
   a processor comprising hardware, the processor being configured to:
      control a laser beam source to emit a laser beam having a pulse train of a frequency at which a bubble is generated in a solution to connect a laser emission end and a crushing target, the laser beam being emitted at a predetermined repetition frequency;

obtain transmission waveform of the laser beam;

determine, from the transmission waveform, a time at which transmittance of the laser beam decreases after reaching a predetermined level, wherein the time corresponds to an estimated time at which the bubble, that connected the laser emission end and the crushing target, contracts such that the bubble does not couple the laser emission end and the crushing target;

set, based on the determined time at which the transmittance of the laser beam decreases after reaching the predetermined level, an adjusted repetition frequency of the pulse train to decrease a period between when the laser beam source is controlled to reduce an output of the laser beam at the end of the pulse train and the time at which transmittance of the laser beam decreases after reaching the predetermined level; and control the laser beam source to emit the next laser beam having the pulse train at the adjusted repetition frequency.

2. The waveform control device according to claim 1, wherein the processor is configured to set the adjusted repetition frequency to be 1.7 kHz or more and/or 2.5 kHz or less.

3. The waveform control device according to claim 1, wherein the processor is further configured to:
acquire image data including the crushing target;
extract scattered light intensity of the laser beam; and
obtain the transmission waveform of the laser beam using the scattered light intensity.

4. The waveform control device according to claim 1, wherein when reducing the output of the laser beam, the output of the laser beam is reduced to an amount that does not cause a temperature rise of the solution thereby suppressing generation of the bubble.

5. The waveform control device according to claim 1, wherein the processor is configured to set the adjusted repetition frequency to be 1.7 kHz or more and/or 3.0 kHz or less.

6. The waveform control device according to claim 1, wherein the processor is configured to set the adjusted repetition frequency to be 1.7 kHz or more and/or 2.0 kHz or less.

7. The waveform control device according to claim 1, wherein the processor is configured to set the adjusted repetition frequency to be 2.5 kHz or more and 3.0 kHz or less.

8. The waveform control device according to claim 1, wherein the processor is configured to control the laser beam source to emit the next laser beam in a state of maintaining a predetermined distance from the laser emission end to the crushing target.

9. A laser lithotripsy method executed by a processor, the laser lithotripsy method comprising:
controlling a laser beam source to emit a laser beam having a pulse train of a frequency at which a bubble is generated in a solution to connect a laser emission end and a crushing target, the laser beam being emitted at a predetermined repetition frequency;
obtaining transmission waveform of the laser beam;
determining, from the transmission waveform, a time at which transmittance of the laser beam decreases after reaching a predetermined level, wherein the time corresponds to an estimated time at which the bubble, that connected the laser emission end and a crushing target, contracts such that the bubble does not couple the laser emission end and the crushing target;
setting, based on the determined time at which the transmittance of the laser beam decreases after reaching the predetermined level, an adjusted repetition frequency of the pulse train to decrease a period between when the laser beam source is controlled to reduce an output of the laser beam at the end of the pulse train and the time at which transmittance of the laser beam decreases after reaching the predetermined level; and
controlling the laser beam source to emit the next laser beam having the pulse train at the adjusted repetition frequency.

10. The laser lithotripsy method according to claim 9, wherein when reducing the output of the laser beam, the output of the laser beam is reduced to an amount that does not cause a temperature rise of the solution, thereby suppressing generation of the bubble.

11. The laser lithotripsy method according to claim 9, wherein setting the adjusted repetition frequency comprises setting the adjusted repetition frequency to be 1.7 kHz or more and/or 3.0 kHz or less.

12. The laser lithotripsy method according to claim 11, wherein setting the adjusted repetition frequency comprises setting the adjusted repetition frequency to be 1.7 kHz or more and 2.5 kHz or less.

13. The laser lithotripsy method according to claim 11, wherein setting the adjusted repetition frequency comprises setting the repetition frequency is 2.5 kHz or more and 3.0 kHz or less.

14. The laser lithotripsy method according to claim 9, wherein controlling the laser beam source to emit the next laser beam comprises controlling the laser beam source to emit the next laser beam in a state of maintaining a predetermined distance from the laser emission end to the crushing target.

15. The laser lithotripsy method according to claim 9, wherein setting the adjusted repetition frequency comprises setting the adjusted repetition frequency to switch between a repetition frequency of 1.7 kHz or more and 2.5 kHz or less and a repetition frequency of 2.5 kHz or more and 3.0 kHz or less.

16. The laser lithotripsy method according to claim 9, wherein setting the adjusted repetition frequency of the pulse train comprises setting a duty ratio of the pulse train to be 45% to 55%.

17. The laser lithotripsy method according to claim 9, further comprising:
acquiring image data including the crushing target;
extracting scattered light intensity of the laser beam; and
obtaining the transmission waveform of the laser beam using the scattered light intensity.

18. A crushing method comprising:
inserting an endoscope into a specimen;
disposing a laser emission end of an endoscope toward a crushing target existing in a solution;
controlling a laser beam source to emit a laser beam having a pulse train of a frequency at which a bubble is generated in a solution to connect a laser emission end and a crushing target, the laser beam being emitted at a predetermined repetition frequency;
obtaining transmission waveform of the laser beam;
controlling a display to display image data acquired by the endoscope;
determining, from the transmission waveform, a time at which transmittance of the laser beam decreases after reaching a predetermined level, wherein the time corresponds to an estimated time at which the bubble, that connected the laser emission end and the crushing target, contracts such that the bubble does not couple the laser emission end and the crushing target;

setting, based on the determined time at which the transmittance of the laser beam decreases after reaching the predetermined level, an adjusted repetition frequency of the pulse train to decrease a period between when the laser beam source is controlled to reduce an output of the laser beam at the end of the pulse train and the time at which transmittance of the laser beam decreases after reaching the predetermined level; and controlling the laser beam source to emit the next laser beam having the pulse train at the adjusted repetition frequency.

19. The crushing method according to claim 18, further comprising:

acquiring image data including the crushing target;

extracting scattered light intensity of the laser beam; and obtaining the transmission waveform of the laser beam using the scattered light intensity.

20. The crushing method according to claim 18, wherein when reducing the output of the laser beam, the output of the laser beam is reduced to an amount that does not cause a temperature rise of the solution thereby suppressing generation of the bubble.

* * * * *